United States Patent
Pasma et al.

(10) Patent No.: US 11,948,415 B2
(45) Date of Patent: Apr. 2, 2024

(54) SECURE GUEST ENROLLMENT AT ELECTRONIC LOCK

(71) Applicant: ASSA ABLOY Americas Residential Inc., New Haven, CT (US)

(72) Inventors: Kevin Pasma, Lake Forest, CA (US); Nedal Almomani, Mission Viejo, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

(21) Appl. No.: 17/820,341

(22) Filed: Aug. 17, 2022

(65) Prior Publication Data

US 2023/0056890 A1    Feb. 23, 2023

Related U.S. Application Data

(60) Provisional application No. 63/234,012, filed on Aug. 17, 2021.

(51) Int. Cl.
*G07C 9/23*    (2020.01)
*E05B 47/02*    (2006.01)
(Continued)

(52) U.S. Cl.
CPC ............ *G07C 9/23* (2020.01); *E05B 47/02* (2013.01); *G06F 16/955* (2019.01); *H04L 9/3213* (2013.01); *G07C 2009/00769* (2013.01)

(58) Field of Classification Search
CPC ............ G07C 9/23; G07C 2009/00769; G07C 9/00563; G07C 9/00571;
(Continued)

(56) References Cited

U.S. PATENT DOCUMENTS 9,396,598 B2 * 7/2016 Daniel-Wayman ...... G07C 9/27
9,424,700 B2    8/2016 Lovett et al.
(Continued)

FOREIGN PATENT DOCUMENTS

CN    112734989 A    4/2021
CN    113689607 A    11/2021
(Continued)

OTHER PUBLICATIONS

International Search Report and Written Opinion for International Application No. PCT/US2022/040629, dated Nov. 28, 2022, 9 pages.

*Primary Examiner* — Nam V Nguyen
(74) *Attorney, Agent, or Firm* — Merchant & Gould P.C.

(57) ABSTRACT

Secure enrollment of a user with an electronic lock is provided. Enrollment with the lock may include a verification process and a secure enrollment mode based on verification of a unique enrollment code (UEC) associated with an enrollment invitation link that may be provided to the user. Selection of the link may direct the user's mobile device to a client application, where an option may be provided for initiating the verification process. The UEC may be communicated to and presented by the lock. The user's device may capture the presented UEC, which may be compared against the UEC generated in association with the link. When validated, the lock may enter the secure enrollment mode, where the user can register an actuation passcode, or the lock may be paired with the mobile device over a short-range wireless connection, which may allow the user to actuate the lock via the client application.

20 Claims, 12 Drawing Sheets

(51) Int. Cl.
*G06F 16/955* (2019.01)
*G07C 9/00* (2020.01)
*H04L 9/32* (2006.01)

(58) Field of Classification Search
CPC ...... G07C 2009/00793; G07C 2209/63; G07C 9/00309; E05B 47/02; G06F 16/955; H04L 9/3213; H04L 2209/80; H04L 9/3231
USPC ......................................................... 340/5.54
See application file for complete search history.

(56) References Cited

U.S. PATENT DOCUMENTS

| | | | |
|---|---|---|---|
| 9,640,002 B1 | 5/2017 | Grosberg | |
| 9,922,481 B2 | 3/2018 | Johnson et al. | |
| 10,304,273 B2 | 5/2019 | Johnson et al. | |
| 10,360,363 B1 | 7/2019 | Grosberg | |
| 10,505,938 B2 | 12/2019 | Love et al. | |
| 10,586,415 B2 * | 3/2020 | Qian ................. | H04L 51/18 |
| 10,720,001 B1 | 7/2020 | Grosberg | |
| 10,755,510 B2 * | 8/2020 | Baumgarte .............. | G07C 9/27 |
| 10,868,815 B2 | 12/2020 | Love et al. | |
| 11,100,742 B2 * | 8/2021 | Conroy ................... | G07C 9/37 |
| 11,210,380 B2 * | 12/2021 | Hoyos .................... | H04L 63/10 |
| 2014/0114706 A1 * | 4/2014 | Blakely ................. | G06Q 10/02 |
| | | | 705/5 |
| 2015/0221147 A1 * | 8/2015 | Daniel-Wayman ...... | G07C 9/21 |
| | | | 340/5.54 |
| 2016/0180618 A1 | 6/2016 | Ho et al. | |
| 2019/0012860 A1 * | 1/2019 | Lee ........................ | H04W 4/00 |
| 2019/0043294 A1 * | 2/2019 | Runyon ............. | G07C 9/00563 |
| 2021/0150421 A1 * | 5/2021 | Abbe ................. | G06F 9/44521 |
| 2021/0158067 A1 * | 5/2021 | Hsu ........................ | G06V 40/12 |

FOREIGN PATENT DOCUMENTS

| | | |
|---|---|---|
| EP | 3819876 A1 | 5/2021 |
| JP | 2014-227677 A | 12/2014 |
| KR | 10-2011-0138856 A | 12/2011 |
| KR | 10-1907923 B1 | 10/2018 |
| WO | 2005017840 A1 | 2/2005 |

* cited by examiner

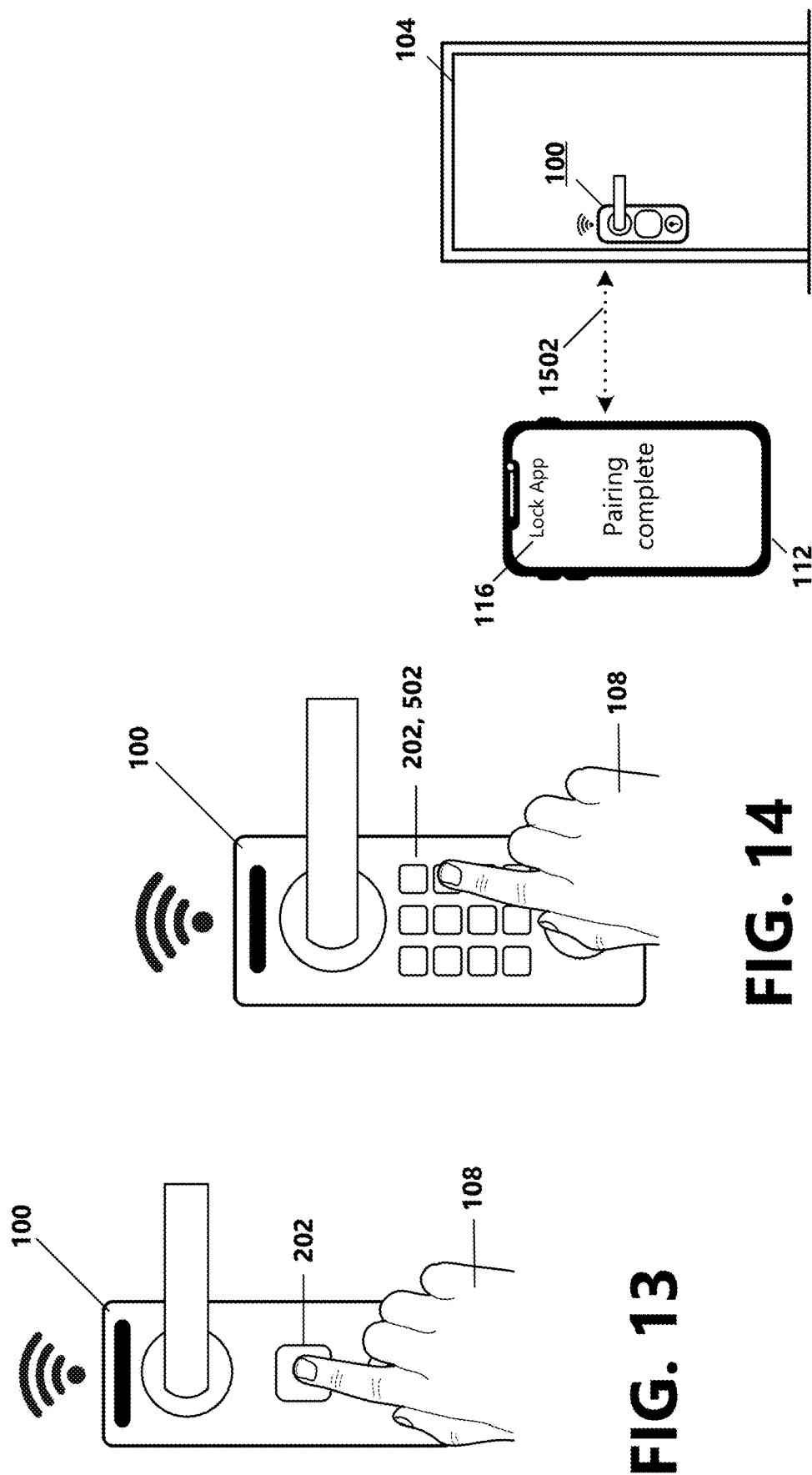

SECURE GUEST ENROLLMENT AT ELECTRONIC LOCK

CROSS-REFERENCE TO RELATED APPLICATIONS

The present application claims priority from U.S. Provisional Patent Application No. 63/234,012, filed on Aug. 17, 2021, the disclosure of which is hereby incorporated by reference in its entirety.

TECHNICAL FIELD

This invention relates to the field of electronic locks. More particularly, this invention relates to systems and methods of providing secure enrollment of a user with an electronic lock.

BACKGROUND

Electronic locks have gained increasing acceptance and widespread use in residential and commercial markets due to the many benefits they provide. One example benefit may include the ability to lock or unlock a door with the use of a mobile device, such as a smartphone or tablet. Another example benefit may include using a programmed code or a biometric input, such as a fingerprint or retina scan to lock or unlock a door. Such benefits are not only useful for the owner or tenant of the premises where the electronic lock is installed, but can also be useful for allowing guest users to lock and unlock the door with their mobile devices, programmed code, or biological characteristics, rather than furnishing guest users with a physical key. For example, a guest user may be an individual whom the owner wishes to grant access to perform permitted actions (e.g., lock, unlock, add a lock actuation passcode) associated with the electronic lock, oftentimes for a temporary time period.

For increased security against man-in-the-middle (MITM) attacks, denial of service, or other attack vectors, current electronic locks may require a physical actuation of a pairing button that is located on an interior assembly of the electronic lock that is mounted to the interior side of the door. For example, actuation of the pairing button may trigger the electronic lock to enter a wireless (e.g., BLUETOOTH®) pairing mode, wherein requirement of a physical actuation of the pairing button can limit the time window where the electronic lock is available for BLUETOOTH© pairing. A disadvantage of this security measure, however, is that the guest user may not be enabled to pair a mobile device with the electronic lock or enroll a code or biometric characteristic in order to actuate the lock without already having access to the interior side of the door. Accordingly, in order to give the guest user access to the interior side of the door, the owner may be required to be present at the premises. Not only is this an inconvenience, but there are various scenarios where this may be infeasible for the owner.

Accordingly, a secure system and method for enabling an individual to enroll as a guest user with an electronic lock without requiring access to the interior assembly of the electronic lock is needed.

SUMMARY

The present disclosure relates generally to systems and methods for providing secure enrollment of a guest user with an electronic lock.

In a first aspect, an electronic lock is provided, wherein the electronic lock comprises: a latch assembly including a bolt movable between a locked position and an unlocked position; a motor configured to receive an actuation command causing the motor to move the bolt from the locked position to the unlocked position or from the unlocked position to the locked position; a wireless circuit configured to communicate wirelessly with a client application installed on a mobile device; a code output interface configured to present a unique enrollment code; at least one processor; and a memory communicatively connected to the processor, the memory storing instructions which, when executed, cause the electronic lock to: receive a unique enrollment code associated with an enrollment invitation link provided to a guest user; in response to receiving an indication to initiate an enrollment code verification process based on a selection of the enrollment invitation link, present the unique enrollment code via the code output interface; and in response to receiving an indication that the unique enrollment code has been received by a mobile device and verified, enter into a secure enrollment mode that enables the guest user to enroll as a user of the electronic lock.

In another aspect, a method is provided for providing secure enrollment of a user with an electronic lock, the method comprising: receiving a unique enrollment code associated with an enrollment invitation link provided to a guest user; in response to receiving an indication to initiate an enrollment code verification process, presenting the unique enrollment code via the code output interface; and in response to receiving an indication that the unique enrollment code has been received by a mobile device and verified, entering into a secure enrollment mode that enables the guest user to enroll as a user of the electronic lock.

In another aspect, a system is provided for providing secure enrollment of a user with an electronic lock, the system comprising: at least one processor; and a memory communicatively connected to the at least one processor, the memory storing instructions which, when executed, cause the system to: in response to receiving a selection of an enrollment invitation link associated with a guest user account for an electronic lock and a unique enrollment code, provide, on a mobile device, a user interface including an option to initiate enrollment with the electronic lock; receive a selection of the option to initiate enrollment with the electronic lock when the mobile device is proximate to the electronic lock; notify a server of the selection to initiate enrollment; receive, via the user interface, an input of the unique enrollment code presented by the electronic lock based on the selection to initiate enrollment; and verify the presented unique enrollment code against the unique enrollment code associated with the enrollment invitation link for enabling the electronic lock to enter into a secure enrollment mode that enables the guest user to enroll as a user of the electronic lock.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 13 is an illustration of a pictorial representation of the electronic lock in a secure enrollment mode, where the electronic lock is able to receive a biometric actuation passcode from the guest user.

FIG. 14 is another illustration of a pictorial representation of the electronic lock in the secure enrollment mode, where the electronic lock is able to receive an alphanumeric actuation passcode from the guest user.

FIG. 15 is an illustration of a pictorial representation of the electronic lock in a pairing mode, where the electronic lock and the guest mobile device can communicate and exchange information over a short-range wireless connection.

DETAILED DESCRIPTION

Figure 1:
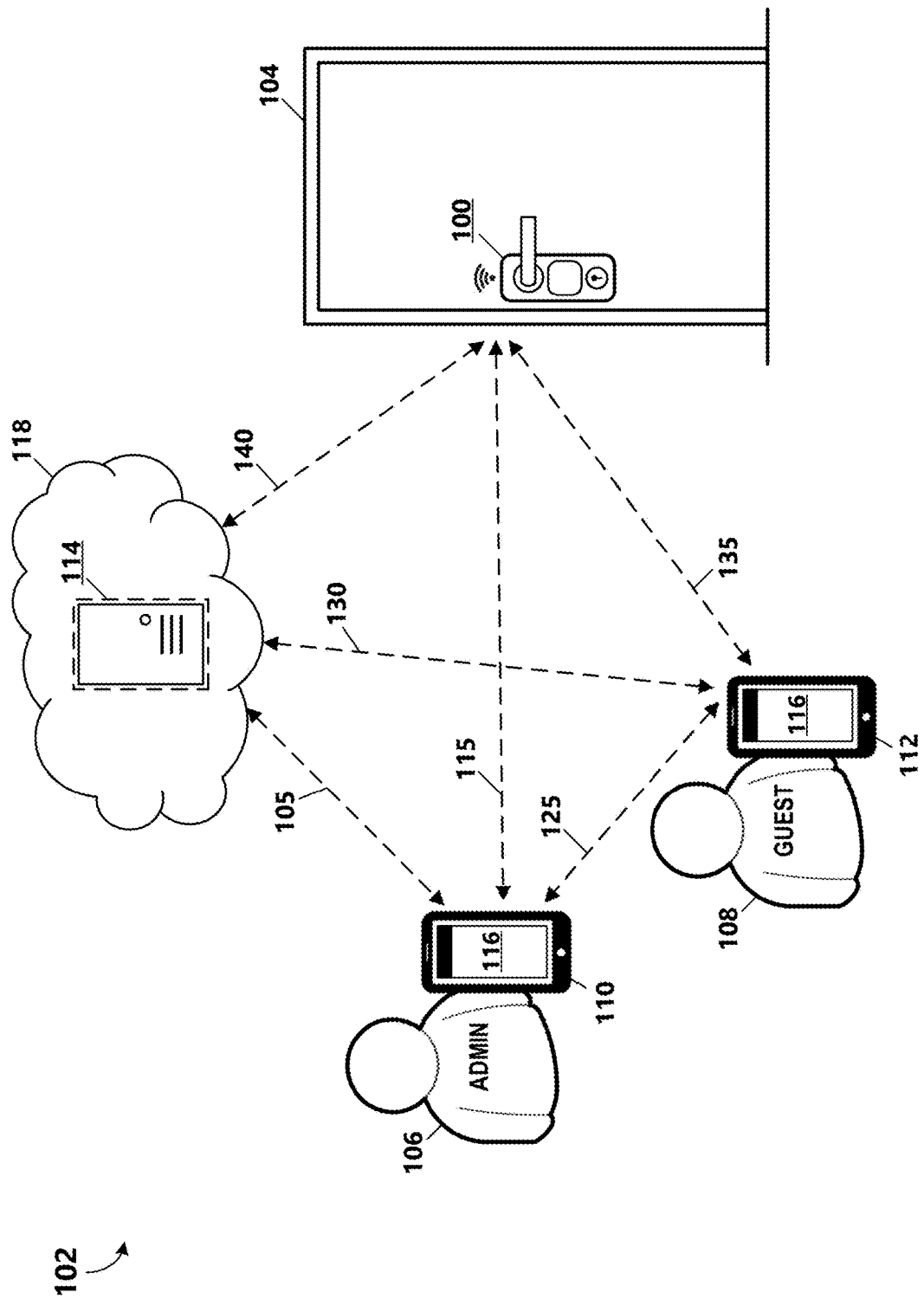
FIG. 1 is a block diagram of an example environment in which aspects of the present disclosure may be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to providing secure enrollment of a guest user with an electronic lock. For example, one or more aspects of the present disclosure may be utilized to enable an individual to enroll as a guest user with an electronic lock at the electronic lock, without requiring access to the interior assembly of the electronic lock. In some examples, enrollment with the electronic lock may include an enrollment code verification process that may be performed to ensure that the guest user is authorized to enroll as a user of the electronic lock and a secure enrollment mode based on verification of the unique enrollment code. For example, a unique enrollment code may be generated and associated with an enrollment invitation link that can be provided to the guest user. Selection of the link may direct the guest user's mobile computing device to a client application associated with the electronic lock, where an option may be provided for initiating the enrollment code verification process.

In some examples, as part of the enrollment code verification process, the unique enrollment code may be communicated to the electronic lock and presented by the electronic lock. The guest user may be enabled to use guest mobile device to capture or otherwise receive the unique enrollment code presented by the electronic lock. The presented and captured unique enrollment code may be compared against the unique enrollment code generated in association with the enrollment invitation link, which when validated, may cause the electronic lock to enter the secure enrollment mode. The unique enrollment code is not a lock actuation passcode and cannot be used to actuate the electronic lock from a locked to an unlocked position. Rather, the unique enrollment code enables the guest user to validate his/her identity such that the electronic lock can enter into the secure enrollment mode. For example, when the electronic lock is in the secure enrollment mode, the guest user may be enabled to register a passcode with the electronic lock that enables the guest user to actuate the lock, or the electronic lock may be enabled to pair with the guest mobile device over a short-range wireless connection, which may allow the guest user to actuate the lock via the client application operating on the guest mobile device.

In example aspects, various wireless protocols can be used. In example embodiments, a Wi-Fi protocol (802.11x) may be used to connect the electronic lock to a server (cloud) device, while a different wireless protocol (e.g., BLUETOOTH®, including BLUETOOTH® Low Energy, or BLE) may be used for short-range communication between the electronic lock and other devices, such as a mobile device used to actuate the lock. In other embodiments, various other wireless protocols can be used, such as other short- or long-range wireless protocols (e.g., cellular, RFID/NFC, Zigbee®, Z-wave®, etc.).

The term "lock" or "lockset" is broadly intended to include any type of lock, including but not limited to, deadbolts, knob locks, lever handle locks, mortise locks, and slide locks, whether mechanical, electrical, or electro-mechanical locks. The locking points may have various mounting configurations and/or locations, including but not limited to: mortised within the doorframe, mounted externally to the doorframe or support structure, and/or affixed directly to the door.

Although this disclosure describes these features as implemented on an electronic deadbolt lock for purposes of example, these features are applicable to any type of lockset, including but not limited to, deadbolts, knobset locks, handleset locks, etc. Still further, example aspects of the present application can be applied to other types of IoT devices for which security is an issue, e.g., wireless/interconnected home devices that store user data.

FIG. 1 illustrates an operating environment 102 in which aspects of the present disclosure may be implemented. As shown, the operating environment 102 includes a door 104 comprising an electronic lock 100 (also referred to as a wireless electronic lockset) installed at a premises. The electronic lock 100 may be operative or configured to lock and unlock the door 104 based on a programmed code or biometric input, or via a client application 116 (e.g., an electronic lock application) operating on a user computing device (e.g., a admin mobile device 110, a guest mobile device 112).

An administrative user 106 of the electronic lock 100 is a master user or authorized person, such as an owner or tenant of the premises where the door 104 comprising the electronic lock 100 is installed. The administrative user 106 has a mobile computing device (herein referred to as admin mobile device 110), such as a smartphone or tablet with wireless communication capabilities. The admin mobile device 110 is capable of communicating 105 with a server 114, communicating 115 with the electronic lock 100, and communicating 125 with a mobile phone or other mobile computing device of a guest user 108 (herein referred to as guest mobile device 112). For example, the admin mobile device 110 may be operative or configured to communicate wirelessly with the server 114, the electronic lock 100, and the guest mobile device 112 using one or more wireless protocols.

The guest user 108 may be a person whom the administrative user 106 may wish to grant access to perform at least a subset of actions (e.g., lock, unlock, change some settings) associated with the electronic lock 100. For example, the guest user 108 may be a short-time user of the electronic lock 100, such as a vacation rental user of the premises, a pet sitter, a cleaning person, etc. In some examples, the administrative user 106 may wish to allow the guest user 108 to enroll as a user of the electronic lock 100 for enabling the guest user 108 to perform lock actions. In some examples, the electronic lock 100 may be configured to enter into a secure enrollment mode, which may allow the guest user 108 to register a passcode (e.g., numeric, alphanumeric, a biometric characteristic, etc.) with the electronic lock 100 that enables the guest user 108 to actuate the lock 100. In other examples, when in the enrollment mode, the electronic lock 100 may be enabled to pair with the guest mobile device 112, which may allow the guest user 108 to actuate the lock 100 via the client application 116 operating on the guest mobile device 112.

According to an aspect of the present disclosure, the electronic lock 100 may be configured to enter into the secure enrollment mode based on verification of a unique enrollment code. For example, an enrollment code verification process may be performed to ensure that the intended guest user 108 is authorized to enroll as a user of the electronic lock 100. In some examples, the unique enrollment code is a limited-use (e.g., one-time use, useful for a limited time period) code. According to an aspect, the unique enrollment code is not a lock actuation passcode and cannot be used to actuate the electronic lock 100 from a locked to an unlocked position. Rather, the unique enrollment code enables the guest user 108 to pair the guest mobile device 112 with the electronic lock 100 or to register a passcode (e.g., numeric, alphanumeric, a biometric characteristic) with the electronic lock 100 that enables the guest user 108 to actuate the lock 100. For example, the enrollment code verification process may improve security of enrollment of a guest user when the administrative user 106 is not present at the premises, and thus can prevent an unintended third party user from enrolling as a user of the electronic lock 100 and gaining access to the premises. The enrollment code verification process further enables the guest user 108 to securely enroll with the electronic lock 100 and to then actuate the lock 100 without already having access to the interior side of the door 104 (e.g., without requiring actuation of a pairing button of the electronic lock 100 that may be located on the interior of the door 104). The guest mobile device 112 is operative or configured to communicate 130 with the server 114, communicate 135 with the electronic lock 100, and communicate 125 with the admin mobile device 110 wirelessly using one or more wireless protocols.

The server 114 may be a physical server or a virtual server hosted in a cloud storage environment 118. In some examples, the electronic lock 100 is operative or configured to communicate 140 with the server 114. Such communication 140 can optionally occur via one or more wireless communication protocols, e.g., WIFI (IEEE 802.11), short-range wireless communication to a WIFI bridge, or other connection mechanism. The server 114 may be operative or configured to expose one or more application programming interfaces (APIs) that may be used for communications between the admin mobile device 110 and server 114 (communication 105), between the guest mobile device 112 and the server 114 (communication 130), and between the server 114 and the electronic lock 100. In some examples, the server 114 may be operative or configured to generally manage user accounts (e.g., the admin user account and guest user accounts) associated with the electronic lock 100 and to relay instructions between authorized mobile devices and the electronic lock 100.

In some examples, as part of the enrollment code verification process that may be performed to ensure that the intended guest user 108 is authorized to enroll as a user of the electronic lock 100, the server 114 may be operative or configured to provide the unique enrollment code to the electronic lock 100. As will be described in further detail below, the electronic lock 100 may be operative or configured to present (e.g., visually, audibly, tactically) the unique enrollment code, which may be captured by a sensor included in the guest mobile device 112. For example, the unique enrollment code may be verified by the client application 116 operating on the guest mobile device 112 or communicated to the server 114 for verification. Upon verification of the unique enrollment code, the electronic lock 100 may be instructed to enter into the secure enrollment mode. In other example implementations, the unique enrollment code may be presented (e.g., visually, audibly, tactically) by the guest mobile device 112, captured by a sensor included in the electronic lock 100, and verified by the electronic lock 100 or by the server 114.

Figure 2:
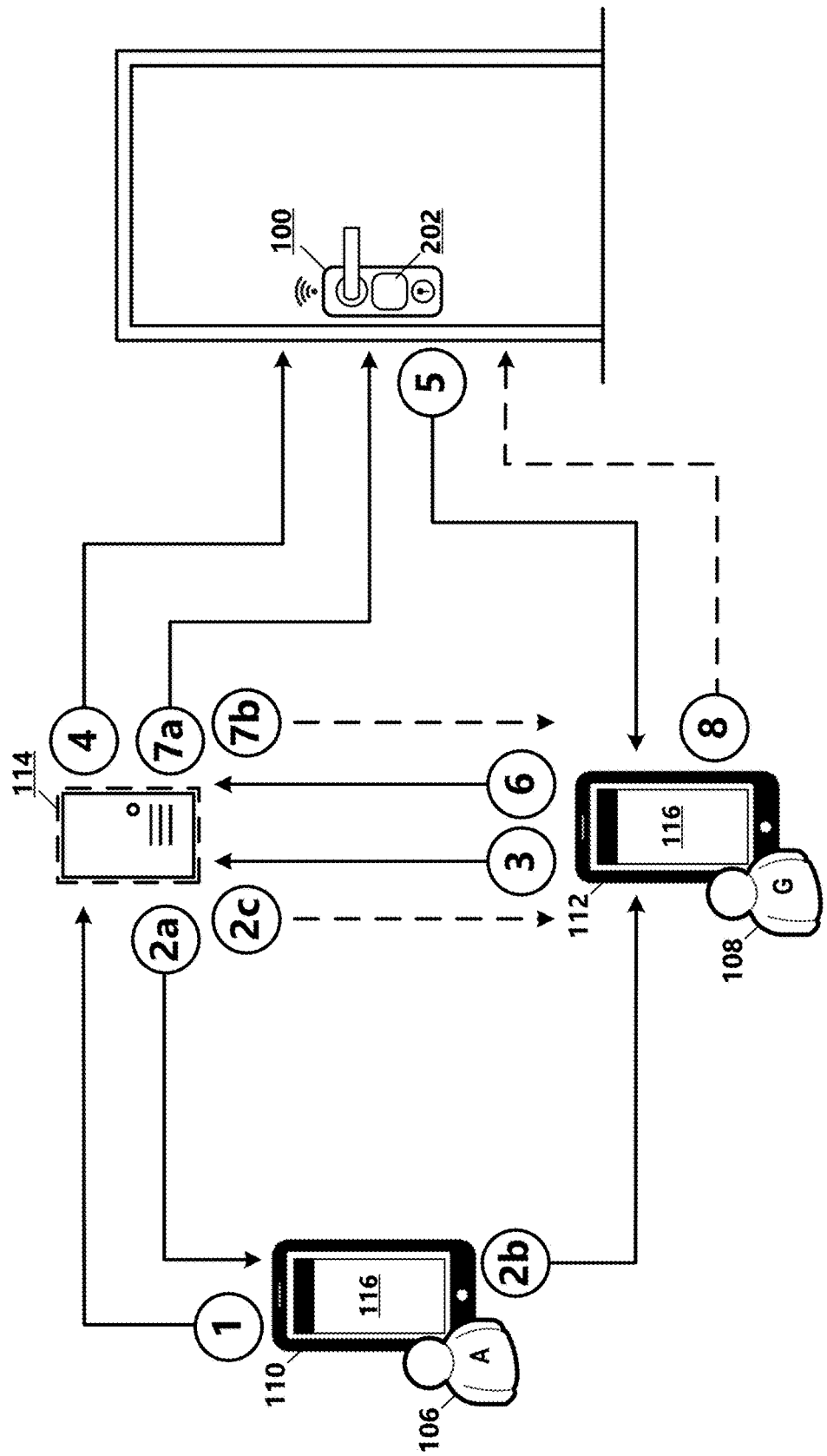
FIG. 2 is a data flow diagram graphically representing an example flow of data as part of providing secure enrollment of a guest user with an electronic lock.

FIG. 2 is a data flow diagram graphically representing an example flow of data as part of providing secure enrollment of a guest user 108 with the electronic lock 100. The example data flow illustrates various communications involved as part of providing secure enrollment of a guest user 108 with the electronic lock 100 from receiving a request to enroll the guest user 108 to initiating the secure enrollment mode of the electronic lock 100. Various arrows are labeled with circled numerals indicative of an example flow of data and/or operations among the components. As should be appreciated, some messages can be exchanged out of the order (e.g., substantially concurrently or in reverse order) as shown in FIG. 2.

With reference now to FIG. 2, circled numeral 1 represents a request to enroll a guest user 108 as a user of the electronic lock 100. For example, the request may be generated by the client application 116 operating on the admin user device 110 responsive to a selection made by the administrative user 106 of the electronic lock 100 to enroll the guest user 108 or to invite the guest user 108 to enroll as a user of the electronic lock 100. In some examples, the client application 116 may provide a user interface (UI) including various options, such as, for example, an option to invite/enroll the guest user 108 as a user of the electronic lock 100. As another example, the UI may include one or more access options to associate with the guest user 108, such as an access level or type (e.g., guest user versus administrative user), a time period during which the guest user's access is allowed (e.g., a one-time time period, a recurring time period), allowed lock actuation methods (e.g., allowance to use the client (lock) application 116 to actuate the electronic lock 100, allowance to register a numeric, alphabetic, or alphanumeric passcode, a biometric characteristic (e.g., fingerprint, retina scan, facial characteristics, voice), and/or another type of unique passcode with the electronic lock 100), and/or other access options. In some examples, the request to invite/enroll the guest user 108 may include one or more access option selections made by the administrative user 106 via the client application UI.

In some examples, the server 114 may operate to create a guest user account associated with the electronic lock 100 based on the request and selections made by the administrative user 106. In some examples, the server 114 may further operate to generate a unique enrollment code that may be associated with the guest user account and communicated to the guest user 108 and utilized to verify the guest user 108 for allowing the electronic lock 100 to enter into the secure enrollment mode. In other examples, the unique enrollment code may be generated by the client application 116 operating on the admin mobile device 110.

Circled numeral 2a represents a response to the request. In some examples, the response may include an enrollment invitation link that may be shared with the guest user 108. For example, when selected, the enrollment invitation link may operate to direct the guest mobile device 112 to a landing page of the client application 116, where the guest user 108 can use the client application 116 to access the guest user account associated with the electronic lock 100 and to verify his/her identity for enrolling as a user of the electronic lock 100.

In some examples, the enrollment invitation may be transmitted to the guest mobile device 112 from the admin mobile device 110, as represented by circled numeral 2b. For example, in some implementations, the enrollment invitation may be included in a text message, an email, a social media message, or other type of electronic message, or may otherwise be transmitted wirelessly to the guest mobile device 112 via a wireless protocol.

In other examples, the enrollment invitation may be transmitted to the guest mobile device 112 from the server 114, as represented by circled numeral 2c. For example, in some implementations, the request to invite/enroll the guest user 108 as a user of the electronic lock 100 may further include contact information (e.g., a phone number, email address, social media identifier) of the guest user 108, which may be used by the server 114 to transmit the enrollment invitation link to the guest mobile device 112 via a text message, email, or other type of electronic message. In this case, the communication represented by circled numeral 2a may alternatively include a notification that the enrollment invitation link associated with the guest user account has been automatically sent to the guest user 108 based on the contact information.

According to an aspect, in response to receiving a selection of the enrollment invitation link, the guest mobile device 112 may operate to open the client application 116 and be directed to a landing page of the client application 116, if the application is already installed on the device; or if the client application 116 is not already installed on the guest mobile device 112, the guest mobile device 112 may first be redirected to a location where the client application 116 can be accessed. As should be appreciated, the client application 116 may be downloaded based on permission given by the guest user 108.

In some examples, the landing page is an enrollment page and/or includes an option for initiating enrollment with the electronic lock 100. In some examples, prior to directing the user to the landing page, the link may first direct the user to a password setup page, where the guest user 108 can establish a password for accessing the guest user account for the electronic lock 100 created on behalf of the guest user 108. In some examples, the enrollment invitation link may include a token that may be parsed for enabling the client application 116 to access the guest user account associated with the electronic lock 100.

In some examples, the guest user 108 may select the option to initiate enrollment with the electronic lock 100 when the guest user 108 is at the premises where the electronic lock 100 is installed and near or proximate to the electronic lock 100. In some examples, as part of enrollment of the guest user 108 as a user of the electronic lock 100, the guest mobile device 112 may utilize global positioning system (GPS) data to ensure that the guest user and associated guest mobile device are at the premises where the electronic lock 100 is installed. In some examples, as part of enrollment of the guest user 108 as a user of the electronic lock 100, the unique enrollment code may be presented, wherein the presentation of the unique enrollment code may be captured, or otherwise received, and compared against the unique enrollment code linked to the guest user account associated with the electronic lock 100. For example, upon validation of the unique enrollment code, the electronic lock 100 may be enabled to enter into the secure enrollment mode.

In some examples, the unique enrollment code may be one of various types of passcodes that may be presented by a code output interface of the electronic lock 100 and captured by a sensor included in the guest mobile device 112. One example unique enrollment code may include a visual passcode presented via one or more lights (e.g., light emitting diode (LED) lights) included in the electronic lock 100. For example, the one or more lights may be included in a keypad that may be included in the electronic lock 100, or may be separate from the keypad. In some examples, the one or more lights may be configured or operative to light up or pulse according to a specific cadence. In other examples, the lights may light up in a specific pattern (e.g., a static pattern or a dynamic pattern). In some examples, a unique enrollment code embodied as a visual passcode may be captured by a camera included in the guest mobile device 112. In other examples, a unique enrollment code embodied as a visual passcode may be observed by the guest user 108 and input into the guest mobile device 112 via a UI input method.

Another example unique enrollment code may include an audible passcode presented via a speaker or other sound-emitting element included in the electronic lock 100. For example, the sound-emitting element may be configured or operative to emit a series of sounds (e.g., beeps, tones, musical tune) or pulses according to a specific cadence and/or tone. In some examples, a unique enrollment code embodied as an audible passcode may be captured by a microphone included in the guest mobile device 112.

Another example unique enrollment code may include a haptic passcode presented via a haptic actuator element included in the electronic lock 100. For example, the haptic actuator element may be configured or operative to provide mechanical feedback through the use of haptic sensations, such a vibration pattern. In some examples, a unique enrollment code embodied as a haptic passcode may be captured by a ceramic piezoelectric sensor, accelerometer, or other type of haptic sensor included in the guest mobile device 112. In other examples, a unique enrollment code embodied as a haptic passcode may be felt by the guest user 108 and a representation of the haptic passcode may be input into the guest mobile device 112 by the guest user 108 via a UI input method.

The unique enrollment code may take a variety of other forms. For example, the unique enrollment code may represent a specific pattern of light emitting diodes, or may represent other display types, such as a display on a touchscreen of a particular pattern. In some instances, the particular pattern may be an alphanumeric code, a bar code, a QR code, and the like. As should be appreciated, other types of unique enrollment codes are possible and are within the scope of the present disclosure.

In some examples, selection of the option to initiate enrollment with the electronic lock 100 may cause the client application 116 operating on the guest mobile device 112 to communicate a message to the server 114, represented by circled numeral 3, to instruct the electronic lock 100 to present the unique enrollment code associated with the enrollment invitation and guest user account. For example, based on the token, the unique enrollment code specific to the guest user's enrollment invitation may be communicated to the electronic lock 100, as represented by circled numeral 4. In some examples, the communication represented by circled numeral 4 may include instructions that the electronic lock 100 may be operative or configured to process for presenting the unique enrollment code.

In some examples and as represented by circled numeral 5, based on the instructions received from the server 114, the electronic lock 100 may display a visual passcode using one or more lights (e.g., LEDs) included in the electronic lock 100 according to a specific cadence or a specific pattern (e.g., a static pattern or a dynamic pattern), play an audible passcode using a sound-emitting element included in the electronic lock 100, or generate a haptic passcode presented via a haptic actuator element included in the electronic lock 100. In some examples, the guest user 108 may use the guest mobile device 112 to capture the unique enrollment code presented by the electronic lock 100, or the guest user 108 may observe the unique enrollment code presented by the electronic lock 100 and input the presented unique enrollment code into the UI provided by the client application 116.

According to an aspect, the captured/input unique enrollment code may be compared against the unique enrollment code linked to the enrollment invitation associated with the guest user 108 for validating the guest user 108. In some examples, the client application 116 operating on the guest mobile device 112 may have access to the assigned unique enrollment code and may be operative or configured to compare and validate the captured/input unique enrollment code. For example, upon validation of the unique enrollment code, the client application 116 may communicate the validation to the server, as represented by circled numeral 6. In other examples, the captured/input unique enrollment code may be communicated to the server 114 to be compared and validated, which may alternatively be represented by circled numeral 6.

In some examples, a communication of the validation may be provided to the electronic lock 100, as represented by circled numeral 7a. For example, upon verification of the unique enrollment code, the electronic lock 100 may be instructed to enter into the secure enrollment mode. In some examples, such as if the validation is performed by the server 114, a notification that the captured/input unique enrollment code has been validated may be communicated to the guest mobile device 112, as represented by circled numeral 7b.

According to an aspect, when the electronic lock 100 is in the secure enrollment mode, the electronic lock 100 may be operative or configured to complete the guest user account enrollment. In some examples, when the electronic lock 100 is in the secure enrollment mode, the electronic lock 100 may be configured to receive an input of a lock actuation passcode that the guest user 108 can use to actuate the lock 100. This input is represented by circled numeral 8.

In some examples, the lock actuation passcode may be a numeric, alphabetic, or alphanumeric code that the guest user 108 may enter into an input interface 202 included in the electronic lock 100. For example, the input interface 202 may include a keypad and/or buttons. In other examples, the lock actuation passcode may be a biometric characteristic, such as a fingerprint, a retina scan, facial characteristics, a voiceprint, etc., that the guest user 108 may enter into the input interface 202 included in the electronic lock 100. In this example, the input interface 202 may include a biometric interface (e.g., a fingerprint sensor, retina scanner, a camera including facial recognition, an audio interface by which voice recognition may be used to actuate the lock), where the guest user's biometric characteristic may be used to actuate the lock rather than requiring entry of a specified lock actuation passcode.

In some implementations, when the electronic lock 100 is in the secure enrollment mode, the electronic lock 100 may be configured to enter into a pairing mode which enables the electronic lock 100 to pair with the guest mobile device 112 over a short-range wireless connection (e.g., a BLE connection). For example, pairing with the guest mobile device 112 may enable the guest user 108 to use the client application 116 operating on the guest mobile device 112 to actuate the electronic lock 100. In some examples, the client application 116 may provide one or more options in the UI that the guest user 108 may select to lock or unlock the electronic lock 100. In some examples, the client application 116 may further provide an option in the UI that enables the guest user 108 to input the lock actuation passcode into the guest mobile device 112 for registering the passcode with the electronic lock 100.

As described above, in other example implementations, the unique enrollment code may be presented by the guest mobile device 112 and received by the electronic lock 100 (e.g., captured by or input into an input interface 202) for verifying the guest user 108 and allowing the electronic lock 100 to enter into the secure enrollment mode. For example, the communication represented by circled numeral 4 may include instructions that the client application 116 operating on the guest mobile device 112 may be operative or configured to process for presenting the unique enrollment code. Accordingly, the presented unique enrollment code may be verified by the electronic lock 100 (e.g., wherein the unique enrollment code linked to the enrollment invitation associated with the guest user 108 may be previously communicated to the electronic lock 100) or communicated by the lock to the server 114 to be verified.

Figure 3:
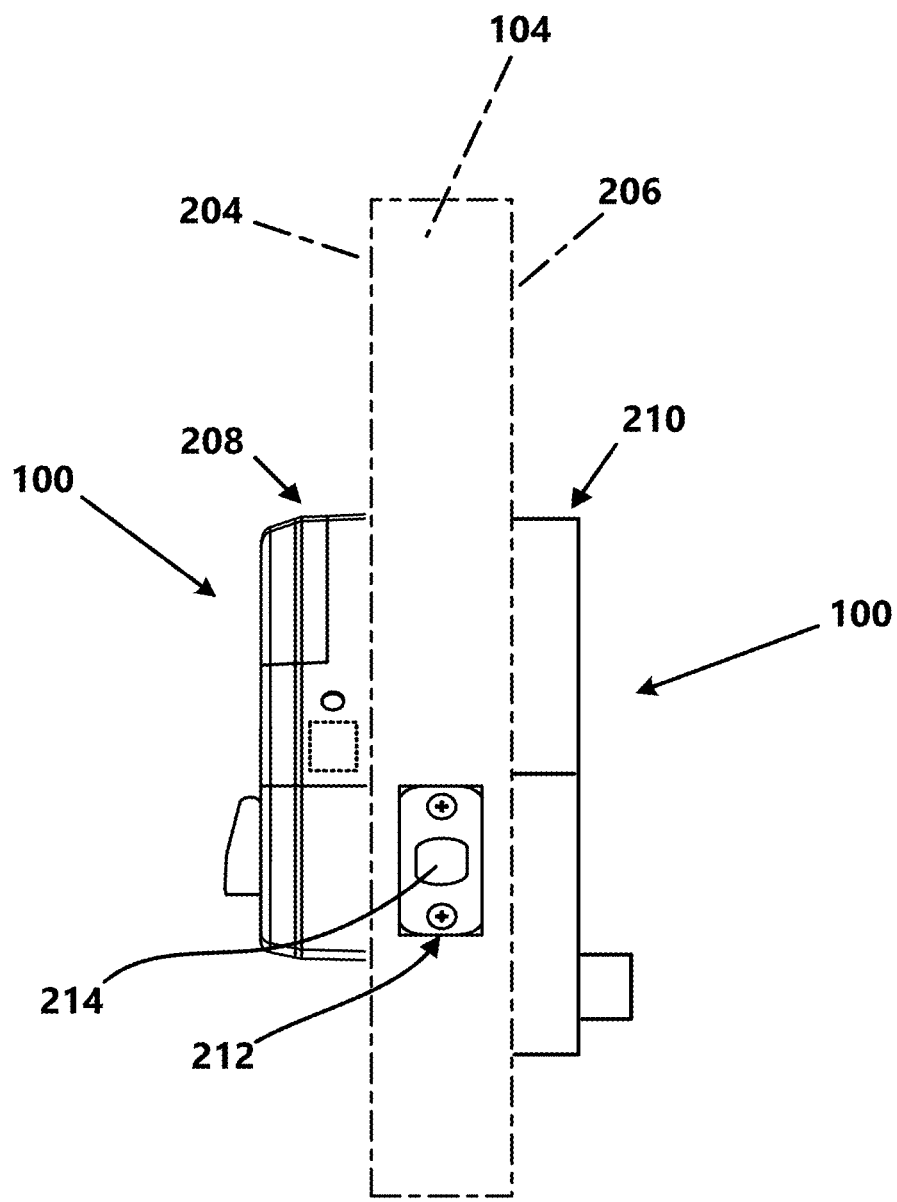
FIG. 3 is an illustration of a side view of a portion of the electronic lock seen in the example environment of FIG. 1.
Figure 4:
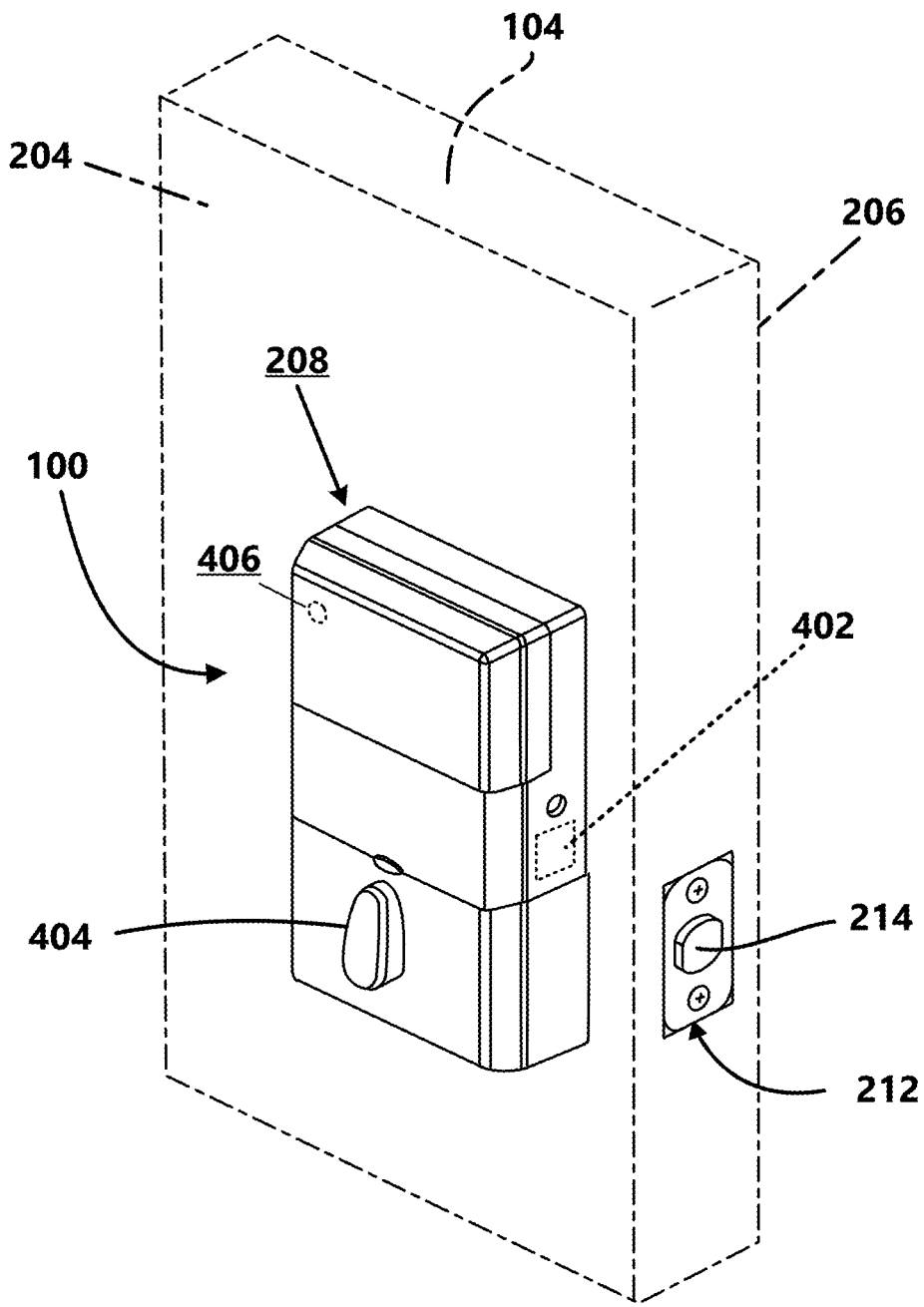
FIG. 4 is an illustration of a rear perspective view of a portion of the electronic lock seen in the example environment of FIG. 1.
Figure 5:
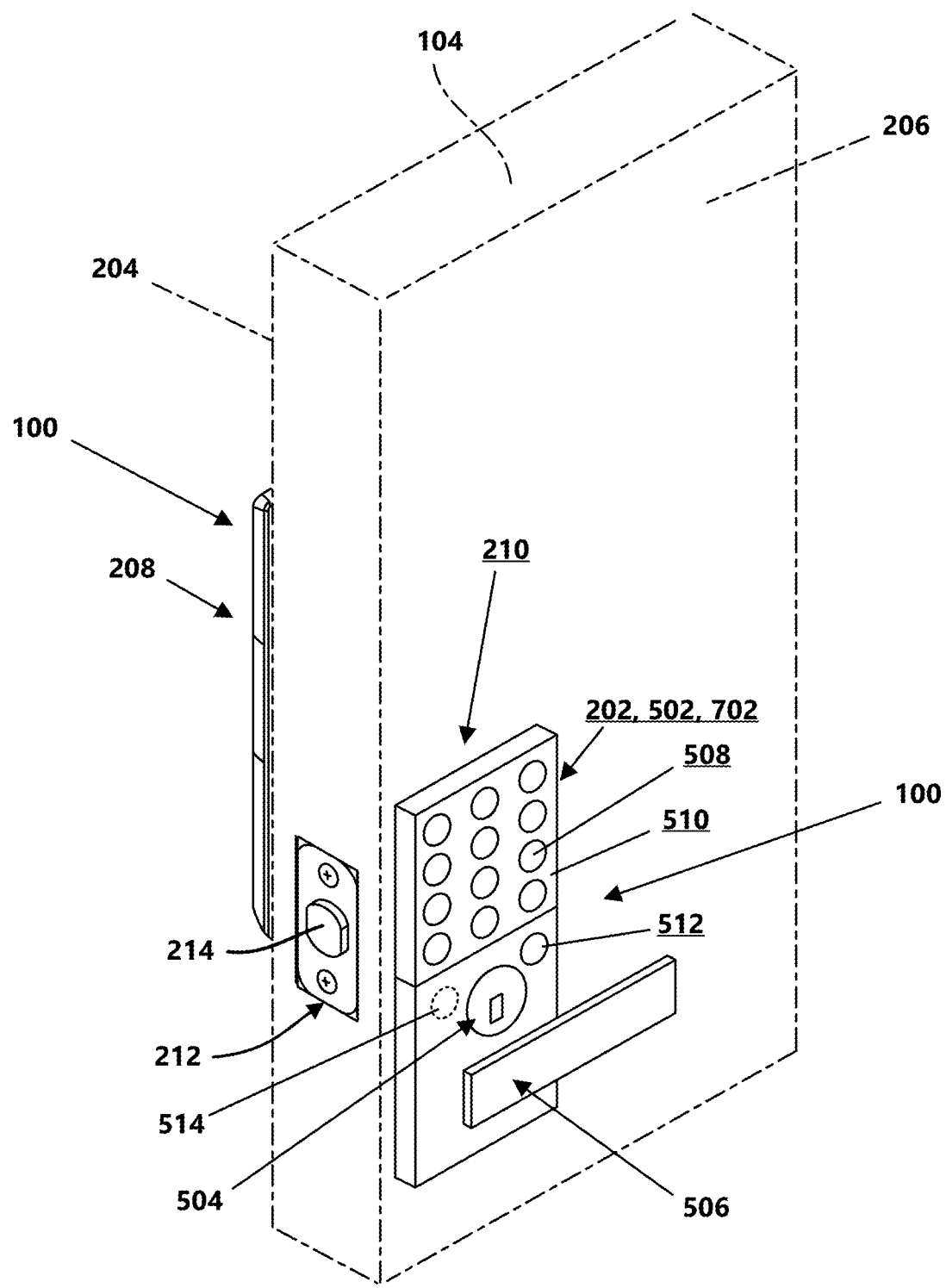
FIG. 5 is an illustration of a front perspective view of a portion of the electronic lock seen in the example environment of FIG. 1.

FIGS. 3-5 illustrate an electronic lock 100 as installed at a door 104, according to one example of the present disclosure. With reference now to FIG. 3, as shown, the door 104 has an interior side 204 and an exterior side 206. The electronic lock 100 may include an interior assembly 208, an exterior assembly 210, and a latch assembly 212. The latch assembly 212 is shown to include a bolt 214 that is movable between an extended position (locked) and a retracted position (unlocked, shown in FIGS. 3-5). Specifically, the bolt 214 is configured to slide longitudinally and, when the bolt 214 is retracted, the door 104 is in an unlocked state. When the bolt 214 is extended, the bolt 214 may protrude from the door 104 into a doorjamb (not shown) to place the door in a locked state.

In some examples, the interior assembly 208 is mounted to the interior side 204 of the door 104, and the exterior assembly 210 is mounted to the exterior side 206 of the door 104. The latch assembly 212 is typically at least partially mounted in a bore formed in the door 104. The term "outside" is broadly used to mean an area outside the door 104 and "inside" is broadly used to denote an area inside the door 104. With an exterior entry door, for example, the exterior assembly 210 may be mounted outside a building, while the interior assembly 208 may be mounted inside a building. With an interior door, the exterior assembly 210 may be mounted inside a building, but outside a room secured by the electronic lock 100, and the interior assembly 208 may be mounted inside the secured room. The electronic lock 100 is applicable to both interior and exterior doors.

Referring to FIG. 4, the interior assembly 208 can include a processing unit 402 (shown schematically) containing electronic circuitry for the electronic lock 100. In some examples, the interior assembly 208 includes a manual turn piece 404 that can be used on the interior side 204 of door 104 to move the bolt 214 between the extended and retracted positions. The processing unit 402 is operable to execute a plurality of software instructions (i.e., firmware) that, when executed, cause the electronic lock 100 to implement the methods and otherwise operate and have functionality as described herein. The processing unit 402 may comprise a device commonly referred to as a processor, e.g., a central processing unit (CPU), digital signal processor (DSP), or other similar device, and may be embodied as a standalone unit or as a device shared with components of the electronic lock 100. The processing unit 402 may include memory communicatively interfaced to the processor, for storing the software instructions. Alternatively, the electronic lock 100 may further comprise a separate memory device for storing the software instructions that is electrically connected to the processing unit 402 for the bi-directional communication of the instructions, data, and signals therebetween.

In some examples, the interior assembly 208 includes a pairing button 406 (shown schematically), which when actuated, may initiate the secure enrollment mode. For example, the secure enrollment mode may enable the electronic lock 100 to receive a lock actuation passcode to be registered with the electronic lock 100 or may enable the electronic lock 100 to communicate with a mobile device (e.g., guest mobile device 112) within short-range wireless communication range for enabling the mobile device to be paired with the electronic lock 100 and used to actuate the lock. One example method of a biometric enrollment with an electronic lock 100 is described in U.S. Patent Publication No. 2021/0158067, titled "SYSTEM AND METHOD OF ENROLLING USERS OF A WIRELESS BIOMETRIC LOCKSET, which is hereby incorporated by reference in its entirety.

In some examples, initiating the secure enrollment mode via an actuation of the pairing button 406 may be limited to users who have access to the interior side 204 of the door 104. Accordingly, aspects of the present disclosure may be utilized to initiate the secure enrollment mode without requiring access to the pairing button 406 or the interior side 204 of the door 104.

Referring to FIG. 5, the exterior assembly 210 can include exterior circuitry 617 communicatively and electrically connected to the processing unit 402. For example, the exterior assembly 210 can include the input interface 202 described above. As shown in FIG. 5, in some examples, the input interface 202 may include a keypad 502 and/or buttons. For example, the keypad 502 and/or buttons may be operative or configured to receive a user input of an actuation passcode via a selection of a sequence of buttons or indicia (e.g., numeric, alphabetic, or alphanumeric) included in the keypad 502.

The keypad 502 may be any of a variety of different types of keypads. For example, the keypad 502 can include a plurality of buttons 508 that can be mechanically actuated by a user (e.g., physically pressed). In some examples, the keypad 502 includes a touch interface 510, such as a touch screen or a touch keypad, for receiving a user input. The touch interface 510 may be configured to detect a user's selection or "press of a button" by contact without the need for pressure or mechanical actuation. An example of the touch interface is described in U.S. Pat. No. 9,424,700 for an "ELECTRONIC LOCK HAVING USAGE AND WEAR LEVELING OF A TOUCH SURFACE THROUGH RANDOMIZED CODE ENTRY," which is hereby incorporated by reference in its entirety.

In other examples, the input interface 202 may include a biometric sensor, such as a fingerprint sensor, retina scanner, a camera including facial recognition, an audio interface by which voice recognition may be used to actuate the lock, or another type of sensor. For example, the biometric sensor may be operative or configured to receive a user input of an actuation passcode via sensing a biometric characteristic of a user.

When a user inputs a valid actuation passcode into the input interface 202, the processor may operate to provide a lock actuation command to an electrical motor to move the bolt 214 between the extended and retracted positions. In some examples, the exterior assembly 210 is electrically connected to the interior assembly 208 Specifically, the input interface 202 may be electrically connected to the interior assembly 208, specifically to the processing unit 402, by, for example, an electrical cable (not shown) that passes through the door 104. When the user inputs a valid actuation passcode via the input interface 202 that is recognized by the processing unit 402, an electrical motor may be energized to retract the bolt 214 of the latch assembly 212, thus permitting the door 104 to be opened from a closed position. In some examples, the electronic lock 100 may include more than one input interface 202. For example, the exterior assembly 210 may include the keypad 502 and a biometric sensor.

In some examples, the electronic lock 100 may comprise a keyway 504 for receiving a key (not shown). For example, when a valid key is inserted into the keyway 504, the valid key can move the bolt 214 between the extended and retracted positions. The exterior side 206 of the door 104 can also include a handle 506, which may be included in or separate from the electronic lock 100.

In some examples, the electronic lock 100 may include a code output interface 512 operative or configured to present a unique enrollment code, which when verified, may enable the electronic lock 100 to enter into the secure enrollment mode. For example, the code output interface 512 may include one or more lights (e.g., LEDs) operative to illuminate according to a specific cadence or a specific pattern (e.g., a static pattern or a dynamic pattern), a sound-emitting element operative to play an audible passcode using, a haptic actuator element operative to emit a haptic passcode, or another type of code output element that may be operative to present the unique enrollment code.

In some examples, the code output interface 512 may include the keypad 502 and/or buttons 508 of the electronic lock 100. For example, in a particular embodiment, the keypad 502 and/or buttons 508 may be further operative or configured to receive a signal from the processing unit 402 to illuminate one or more of the buttons 508 or indicia associated with the button 508 according to a specific cadence or a specific pattern (e.g., a static pattern or a dynamic pattern) based on the unique enrollment code. For example, the cadence or pattern of illumination of the buttons 508 may visually reveal the unique enrollment code, which may be sensed by or input into the guest mobile device 112 and verified for allowing the guest user to enroll an actuation passcode with the electronic lock 100. As an example, the actuation passcode may be a numeric, alphabetic, or alphanumeric passcode that the guest user 108 may input via the keypad 502.

As described above, the guest user 108 may use the guest mobile device 112 to capture the unique enrollment code presented by the code output interface 512 of the electronic lock 100, or the guest user 108 may observe the unique enrollment code presented by the electronic lock 100 and input the presented unique enrollment code into the UI provided by the client application 116. For example, the unique enrollment code may be verified by the client application 116 operating on the guest user device 112 or communicated to the server 114 for verification. Upon verification of the unique enrollment code, the electronic lock 100 may be instructed to enter into the secure enrollment mode, where the electronic lock 100 may be enabled to receive and store an actuation passcode input by the guest user 108 and/or to communicate and be paired with the guest mobile device 112 when the guest mobile device 112 is within short-range wireless communication range of the electronic lock 100.

In other example implementations, the unique enrollment code may be presented (e.g., visually, audibly, tactically) by the guest mobile device 112 and captured by a sensor 514 that may be included in the electronic lock 100. For example, the electronic lock 100 may include one or more sensors 514, such as a camera, a proximity sensor, a ceramic piezoelectric sensor, an accelerometer, or other type of sensor that may be operative or configured to capture a unique enrollment code presented by a mobile computing device. In other example implementations, the unique enrollment code may be presented (e.g., visually, audibly, tactically) by the guest mobile device 112 and observed by the guest user 108, who may use the keypad 502 or other input interface 202 to enter the unique enrollment code into the electronic lock 100. In some examples, the unique enrollment code may be verified by the electronic lock 100. In other examples, the unique enrollment code may be communicated to and verified by the server 114.

Still further, an electrical connection between the exterior assembly 210 and the interior assembly 208 allows the processing unit 402 to communicate with other features included in the exterior assembly 210, as noted below.

Figure 6:
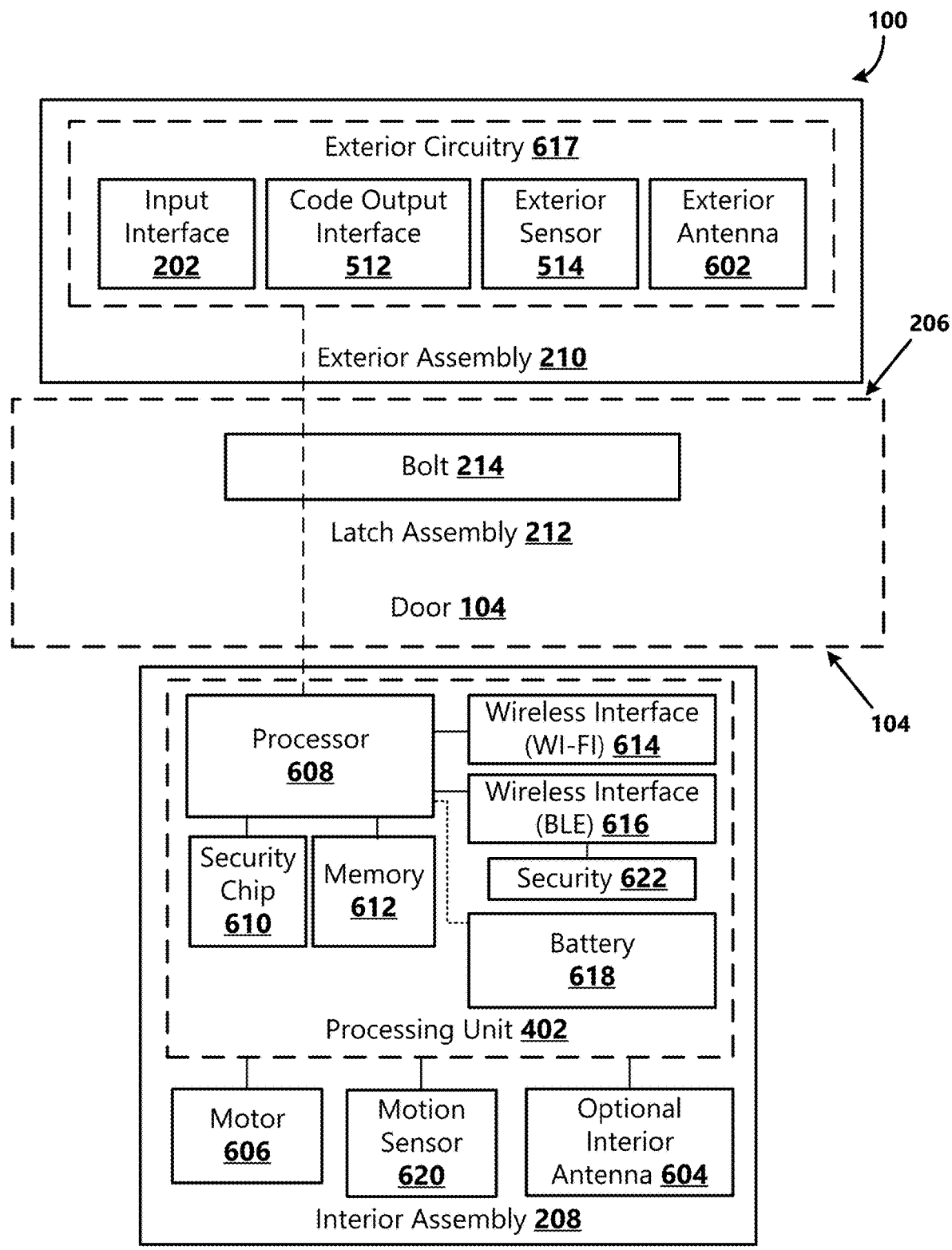
FIG. 6 is an illustration of a schematic view of the electronic lock seen in the example environment of FIG. 1.

FIG. 6 is a schematic representation of the electronic lock 100 mounted to the door 104. The interior assembly 208, the exterior assembly 210, and the latch assembly 212 are shown.

The exterior assembly 210 is shown to include the input interface 202, which may include the keypad 502 and an optional exterior antenna 602 usable for communication with a remote device. In some examples, the exterior assembly 210 can include one or more sensors 514 by which conditions exterior to the door 104 can be sensed. In response to such sensed conditions, notifications may be sent by the electronic lock 100 to a server 114, admin mobile device 110, or guest mobile device 112 including information associated with a sensed event (e.g., time and description of the sensed event, or remote feed of sensor data obtained via the sensor). In some examples, the exterior assembly 210 can include one or more sensors 514 by which the unique enrollment code may be received.

In some examples, the exterior antenna 602 is capable of being used in conjunction with an optional interior antenna 604, such that the processing unit 402 can determine where a mobile device is located. Only a mobile device (e.g., admin mobile device 110 or guest mobile device 112) that is paired with the electronic lock 100 and determined to be located on the exterior of the door 104 may be able to actuate (unlock or lock) the door. This prevents unauthorized users from being located exterior to the door 104 of the electronic lock 100 and taking advantage of an authorized mobile device that may be located on the interior of the door, even though that authorized mobile device is not being used to actuate the door. However, such a feature is not required, but can add additional security. In alternative arrangements, the electronic lock 100 may only be actuable from either the input interface 202 (via entry of a valid actuation passcode) or from the client application 116 installed on the mobile device (e.g., admin mobile device 110 or guest mobile device 112). In some implementations, the exterior antenna 602 may be excluded entirely.

As described above, the interior assembly 208 includes the processing unit 402. The interior assembly 208 can also include a motor 606 and the optional interior antenna 604.

As shown, the processing unit 402 includes at least one processor 608 communicatively connected to a security chip 610, a memory 612, various wireless communication interfaces (e.g., including a WI-FI interface 614 and/or a BLUETOOTH interface 616), and a battery 618. The processing unit 402 is located within the interior assembly 208 and is capable of operating the electronic lock 100, (e.g., by actuating the motor 606 to actuate the bolt 214).

In a particular example, the BLUETOOTH interface 616 comprises a BLUETOOTH Low Energy (BLE) interface. Additionally, in some embodiments, the BLUETOOTH interface 616 is associated with a security chip 622, for example, a cryptographic circuit capable of storing cryptographic information and generating encryption keys usable to generate certificates for communication with other systems (e.g., the admin mobile device 110, the guest mobile device 112).

In some examples, the processor 608 can process signals received from a variety of devices to determine whether the electronic lock 100 should be actuated. Such processing can be based on a set of preprogramed instructions (i.e., firmware) stored in the memory 612. In certain embodiments, the processing unit 402 can include a plurality of processors 608, including one or more general purpose or specific purpose instruction processors. In some examples, the processing unit 402 is configured to capture an input interface input event from a user and store the input interface input event in the memory 612. In other examples, the processor 608 may receive a signal from the exterior antenna 602, the interior antenna 604, or a motion sensor 620 (e.g., a vibration sensor, gyroscope, accelerometer, motion/position sensor, or combination thereof) and can validate received signals in order to actuate the lock 100. In still other examples, the processor 608 may receive signals from the BLUETOOTH interface 616 to determine whether to actuate the electronic lock 100.

In some examples, the interior assembly 208 also includes the battery 618 to power the electronic lock 100. In one example, the battery 618 may be a standard single-use (disposable) battery. Alternatively, the battery 618 may be rechargeable. In still further embodiments, the battery 618 is optional altogether, replaced by an alternative power source (e.g., an AC power connection).

As mentioned above, the interior assembly 208 may also include the motor 606 that may be capable of actuating the bolt 214. In use, the motor 606 may receive an actuation command from the processing unit 402, which causes the motor 606 to actuate the bolt 214 from the locked position to the unlocked position or from the unlocked position to the locked position. In some examples, the motor 606 actuates the bolt 214 to an opposing state. In some examples, the motor 606 receives a specified lock or unlock command, where the motor 606 may only actuate the bolt 214 if the bolt 214 is in the correct position. For example, if the door 104 is locked and the motor 606 receives a lock command, then no action may be taken. If the door 104 is locked and the motor 606 receives an unlock command, then the motor 606 may actuate the bolt 214 to unlock the door 104.

As noted above, the optional interior antenna 604 may also be located in the interior assembly 208. In some examples, the interior antenna 604 may be operative or configured to operate together with the exterior antenna 602 to determine the location of the admin mobile device 110 or the guest mobile device 112. In some examples, only a mobile device determined to be located on the exterior side 206 of the door 104 may be able to unlock (or lock) the door 104. For example, this may prevent unauthorized users from being located near the electronic lock 100 and taking advantage of an authorized mobile device that may be located on the interior side 208 of the door 104, even though the authorized mobile device is not being used to unlock the door 104. In alternative embodiments, the interior antenna 604 can be excluded entirely, since the electronic lock 100 may be actuated only by an authorized mobile device.

In some embodiments, the processing unit 402 may include a security chip 610 that is communicatively interconnected with one or more instances of the processor 608. In some examples, the security chip 610 can, for example, generate and store cryptographic information usable to generate a certificate usable to validate the electronic lock 100 with a remote system, such as the server 114 or mobile device (e.g., admin mobile device 110 or guest mobile device 112).

In certain embodiments, the security chip 610 may include a one-time write function in which a portion of memory of the security chip 610 can be written only once, and then locked. Such memory can be used, for example, to store cryptographic information derived from characteristics of the electronic lock 100, or its communication channels with server 114, the admin mobile device 110, or the guest mobile device 112. Accordingly, once written, such cryptographic information can be used in a certificate generation process which ensures that, if any of the characteristics reflected in the cryptographic information are changed, the certificate that is generated by the security chip 610 would become invalid, and thereby render the electronic lock 100 unable to perform various functions, such as communicate with the server 114, the admin mobile device 110, or the guest mobile device 112, or operate at all, in some cases.

In some embodiments, the security chip 610 may be configured to generate a unique enrollment code that, when received by the guest mobile device 112 and validated, triggers a secure enrollment mode of the electronic lock 100. In some examples, the secure enrollment mode may enable the electronic lock 100 to receive an actuation passcode from a user and store the actuation passcode in the memory 612. In other examples, the secure enrollment mode may enable the electronic lock 100 to pair with a proximate mobile device (e.g., guest mobile device 112 on which the client application 116 is operating).

In some examples, the unique enrollment code may be a random value. In other examples, the administrative user 106 may be enabled to change the unique enrollment code by setting their own code or by requesting a random value to be generated by the client application 116 operating on the admin mobile device 110. In some examples, the length of the unique enrollment code is variable. According to an aspect, for increased security, the unique enrollment code may be a limited-use passcode. For example, the unique enrollment code may be limited to a single use or may be active for a preset or administrative user-selected time duration.

The memory 612 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

As noted above, the processing unit 402 can include one or more wireless interfaces, such a WI-FI interface 614 and/or a BLUETOOTH interface 616. Other RF circuits can be included as well. In the example shown, the interfaces 614, 616 are capable of communication using at least one wireless communication protocol. In some examples, the processing unit 402 can communicate with a remote device via the WI-FI interface 614, or a local device via the BLUETOOTH interface 616. In some examples, the processing unit 402 can communicate with the admin mobile device 110 or the guest mobile device 112 and the server 114 via the WI-FI interface 614, and can communicate with the admin mobile device 110 or the guest mobile device 112 when the mobile device is in proximity to the electronic lock 100 via the BLUETOOTH interface 616. In some embodiments, the processing unit 402 may be configured to communicate with the admin mobile device 110 or the guest mobile device 112 via the BLUETOOTH interface 616, and communications between the admin mobile device 110 or the guest mobile device 112 and electronic lock 100 when the admin mobile device 110 or the guest mobile device 112 is out of range of BLE wireless signals can be relayed via the server 114, e.g., via the WI-FI interface 614.

As should be appreciated, in alternative embodiments, other wireless protocols can be implemented as well, via one or more additional wireless interfaces. In some examples, the electronic lock 100 can wirelessly communicate with external devices through a desired wireless communications protocol. In some examples, an external device can wirelessly control the operation of the electronic lock 100, such as operation of the bolt 214. The electronic lock 100 can utilize wireless protocols including, but not limited to, the IEEE 802.11 standard (Wi-Fi®), the IEEE 802.15.4 standard (Zigbee® and Z-Wave®), the IEEE 802.15.1 standard (BLUETOOTH®), a cellular network, a wireless local area network, near-field communication protocol, and/or other network protocols. In some examples, the electronic lock 100 can wirelessly communicate with networked and/or distributed computing systems, such as may be present in a cloud-computing environment.

In a particular embodiment, the processor 608 may receive a signal at the BLUETOOTH interface 616 via a wireless communication protocol (e.g., BLE) from the admin mobile device 110 or the guest mobile device 112 for communication of an intent to actuate the electronic lock 100. As illustrated in further detail below, the processor 608 can also initiate communication with the server 114 via the WI-FI interface 614 (or another wireless interface) for purposes of validating an attempted actuation of the electronic lock 100, or receiving an actuation command to actuate the electronic lock 100.

In a particular embodiment, the processor 608 may receive a signal via the WI-FI interface 614 for communication of a unique enrollment code, which the processor may be instructed to present for validating the guest user 108. Additionally, the processor 608 may receive a signal from the server 114 via the WI-FI interface 614 or from the guest mobile device 112 via the BLUETOOTH interface 616 for communication of a successful validation of the unique enrollment code and authorization to complete enrollment of the guest user 108.

Additionally, various other settings can be viewed and/or modified via the WI-FI interface 614 from the server 114. As such, the administrative user 106 or the guest user 108 may use the admin mobile device 110 or the guest mobile device 112 to access an account associated with the electronic lock 100, such as to view and modify settings of that lock, which may then be propagated from the server 114 to the electronic lock 100. In alternative embodiments, other types of wireless interfaces can be used; generally, the wireless interface used for communication with a mobile device can operate using a different wireless protocol than a wireless interface used for communication with the server 114.

As mentioned above, in some example embodiments, the electronic lock 100 may include an integrated motion sensor 620. Using such a motion sensor (e.g., an accelerometer, gyroscope, or other position or motion sensor) and wireless capabilities of a mobile device or an electronic device (i.e., fob) with these capabilities embedded inside can assist in determining various types of motion events (e.g., a door opening or door closing event, a lock actuation or lock position event, or a knock event based on vibration of the door). In some cases, motion events can cause the electronic lock 100 to perform certain processing (e.g., to communicatively connect to or transmit data to a mobile device 110, 112 in proximity to the electronic lock 100; to present a unique enrollment code). In alternative embodiments, other lock actuation sequences may not require use of a motion sensor 620. For example, if the admin mobile device 110 or the guest mobile device 112 is in valid range of the electronic lock 100 when using a particular wireless protocol (e.g., BLE), then a connection may be established with the electronic lock 100. Other arrangements are possible as well, using other connection sequences and/or communication protocols.

Referring to FIGS. 1-6 generally, in example embodiments, the electronic lock 100 may be used on both interior and exterior doors 104. Described herein are non-limiting examples of a wireless electronic lockset. It should be noted that the electronic lock 100 may be used on other types of doors 104, such as a garage door or a doggie door, or other types of doors that require an authentication process to unlock (or lock) the door. As such, the electronic lock 100 may be constructed as a deadbolt lock as in some of the examples described herein, but is understood to be adapted to a variety of mechanical configurations and motor/solenoid combinations for latch and/or deadbolt actuation.

In some embodiments, the electronic lock 100 is made of mixed metals and plastic, with engineered cavities to contain electronics and antennas. For example, in some embodiments, the lock utilizes an antenna near the exterior face of the lockset, designed inside the metal body of the lockset itself. The metal body can be engineered to meet strict physical security requirements and also allow an embedded front-facing antenna to propagate RF energy efficiently.

Figure 7:
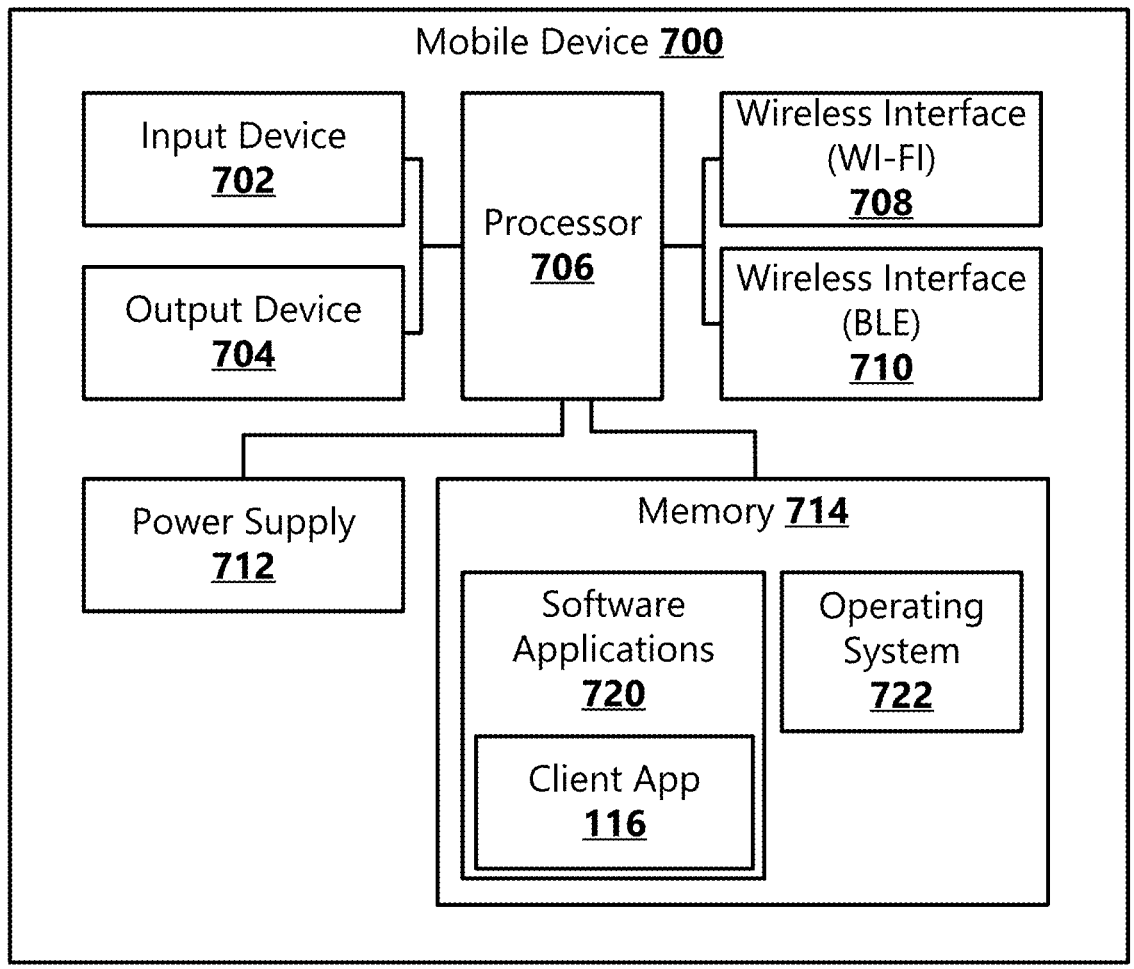
FIG. 7 is an illustration of a schematic representation of a mobile device seen in the example environment of FIG. 1.

FIG. 7 illustrates a schematic diagram of a mobile device 700, such as the admin mobile device 110 and the guest mobile device 112, usable in embodiments of the disclosure to enable secure enrollment of the guest user 108 with the electronic lock 100. For example, one or more aspects of the present disclosure may be utilized to enable the guest user 108 to enroll as a guest user with the electronic lock 100, without requiring access to the interior assembly 208 of the electronic lock 100.

In some embodiments, the mobile device 700 operates to form a BLUETOOTH or BLE connection with a network enabled security device such as the electronic lock 100. The mobile device 700 may then communicate with the server 114 via a WI-FI or mobile data connection. The mobile device 700 thus can operate to communicate information between the electronic lock 100 and the server 114. The mobile device 700 shown in FIG. 7 includes an input device 702, an output device 704, a processor 706, a wireless WI-FI interface 708, a wireless BLE interface 710, a power supply 712, and a memory 714.

The input device 702 operates to receive input from external sources. Such sources can include inputs received from a user (e.g., the administrative user 106 or the guest user 108) and/or inputs received from the electronic lock 100. For example, inputs received from a user can be received through a touchscreen, a stylus, a keyboard, a microphone, a camera, etc. In other examples, inputs received from the electronic lock 100 can be received via the camera, the microphone, a motion sensor (e.g., an accelerometer, gyroscope, or other position or motion sensor), or other type of sensor. According to a particular example, the guest mobile device 112 may operate to receive the unique enrollment code presented by the electronic lock 100 via the input device 702.

The output device 704 operates to provide output of information from the mobile device 700. In one example, a display can output visual information. In another example, a speaker can output audio information. In some examples, the output device 704 may operate to present a unique enrollment code, which may be input into or sensed by the electronic lock 100 for verifying the guest user 108 and enabling the secure enrollment mode of the electronic lock 100. In addition, location data of the mobile device 700, such as GPS information, may be provided to the electronic lock via the output device 704 or vie either of interfaces 708, 710 described below, to provide further information to the electronic lock regarding the current presence/location of the mobile device 700.

The processor 706 operates to read data and instructions. For example, the data and instructions can be stored locally, received from an external source, or accessed from removable media.

The WI-FI interface 708 may operate similarly to the WI-FI interface 614. A WI-FI connection, for example, can be established with the server 114.

The wireless (BLE) interface 710 may operate similarly to the BLUETOOTH interface 616. A BLE connection, for example, can be established with the electronic lock 100.

The power supply 712 may operate to provide power to the processor 706.

The memory 714 includes software applications 720 and an operating system 722. The memory 714 contains data and instructions that are usable by the processor 706 to implement various functions of the mobile device 700.

The software applications 720 can include applications usable to perform various functions on the mobile device 700. One such application is the client application 116. In one example implementation, when the client application 116 is operating on the admin mobile device 110, the client application 116 can be configured to provide a user interface, receive a selection to enroll the guest user 108 as a guest user of the electronic lock 100, and communicate the enrollment selection to the server 114 for generating a unique enrollment code that can be used to validate the guest user 108 and allowing the guest user 108 to complete enrollment with the electronic lock 100. In another example implementation, when the client application 116 is operating on the guest mobile device 112, the client application 116 can be configured to provide a user interface, receive a selection to complete enrollment with the electronic lock 100 (e.g., when the guest mobile device 112 is within proximity to the electronic lock 100), receive the unique enrollment code presented by the electronic lock 100, and validate the received unique enrollment code or use the server 114 to validate the received unique enrollment code. For example, upon validation of the unique enrollment code, the electronic lock 100 may enter the secure enrollment mode, where the guest user 108 may be enabled to complete enrollment with the electronic lock 100.

In some examples, when the electronic lock 100 is in secure enrollment mode, the electronic lock 100 may be triggered to enter a BLUETOOTH pairing mode, which may enable the guest mobile device 112 and the electronic lock 100 to perform a pairing process, which when completed, enables the guest user 108 to perform at least a subset of electronic lock actions (e.g., actuate the electronic lock 100, add an access/actuation passcode) via the client application 116.

Figure 8:
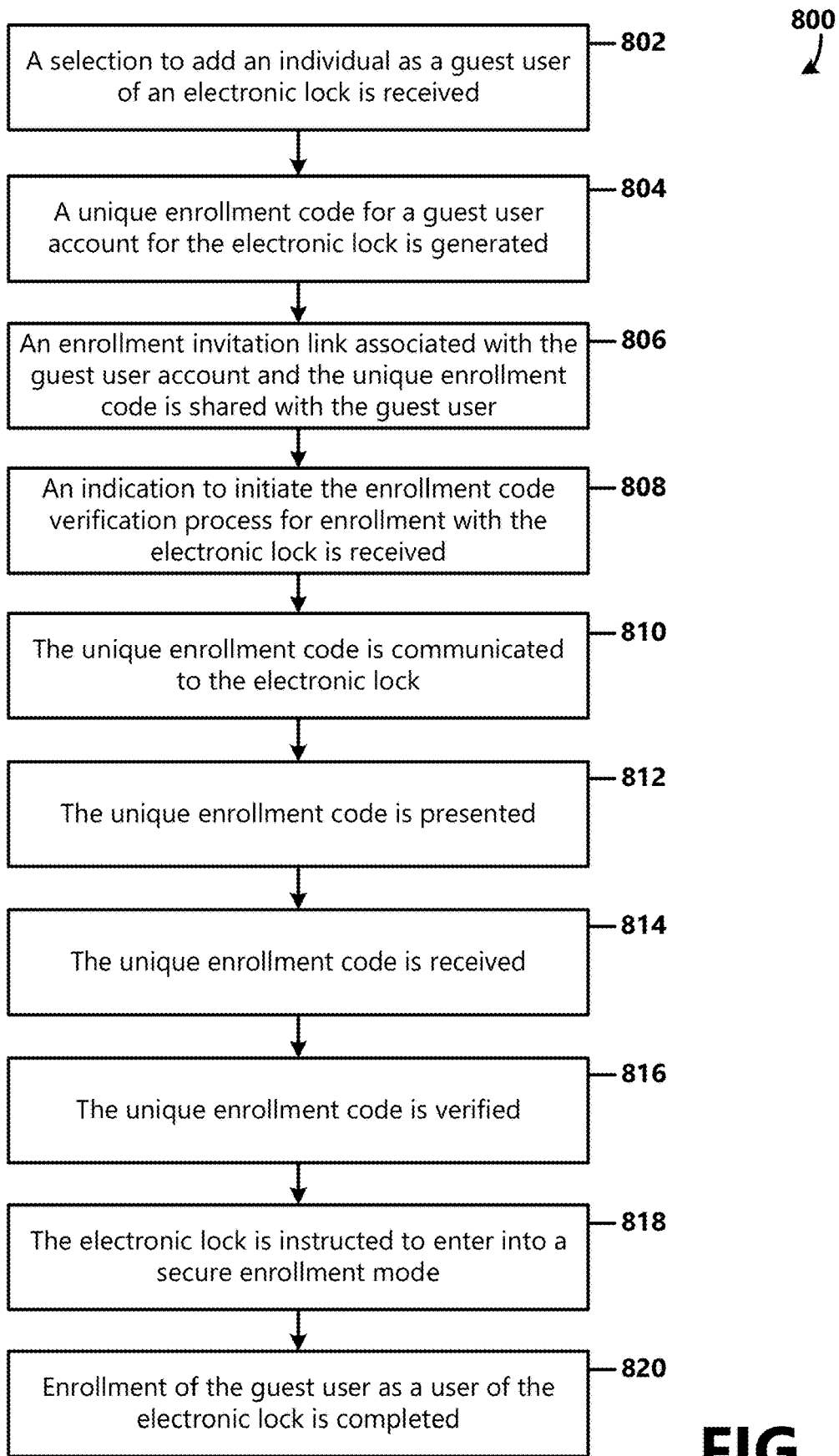
FIG. 8 is a flowchart of a method of providing secure enrollment of a guest user with the electronic lock within the example environment of FIG. 1.

With reference now to FIG. 8, an example flowchart of a method 800 of providing secure enrollment of a guest user 108 with an electronic lock 100, for example, to enable enrollment of an individual as a user of the electronic lock without requiring access to the interior assembly of the electronic lock 100 (e.g., inside the premises protected by the electronic lock 100).

At OPERATION 802, a selection to add the guest user 108 as a user of the electronic lock 100 may be received. For example, the administrative user 106 of the electronic lock 100 may use the client application 116 operating on the admin mobile device 110 to notify the server 114 of a request to allow the guest user 108 to enroll as a user of the electronic lock 100. For example, a guest user account associated with the electronic lock 100 may be created and stored at the server 114. In some examples, the selection to add the guest user 108 as a user of the electronic lock 100 may further include one or more access control selections. In some examples, the selection to add the guest user 108 as a user of the electronic lock 100 may further include the guest user's contact information (e.g., the guest mobile device phone number, an email address, a social media identifier). The one or more access control selections and guest user contact information may be stored in association with the guest user account.

According to an aspect, enrollment of a user with the electronic lock 100 using aspects of the present disclosure may have increased security based on inclusion of the verification process to ensure that the intended guest user 108 is authorized to enroll as a user of the electronic lock 100. Accordingly, at OPERATION 804, a unique enrollment code for the verification process a may be generated. For example, the unique enrollment code may be uniquely associated with a guest user account for the electronic lock 100, wherein the guest user account may be created based on the selection(s) made by the administrative user 106 to add the guest user 108 as a user of the electronic lock 100. In some examples, the unique enrollment code may be generated by the client application 116 operating on the admin mobile device 110 and communicated to the server 114. In other examples, the unique enrollment code may be generated by the server 114. As described above, the unique enrollment code may be a passcode unique to the guest user enrollment selection/request and may be stored at the server 114 in association with the guest user account for the electronic lock 100. In some examples, the unique enrollment code may represent a unique static or dynamic pattern of information that can be visually, audibly, or tactically presented. The enrollment code may represent any type of pattern or visual/audio indicator, such as LEDs, visible numerals, or the like.

At OPERATION 806, an enrollment invitation link may be communicated to and received by the guest mobile device 112. For example, the enrollment invitation link may be linked to the guest user account for electronic lock 100 and to the unique enrollment code generated for the guest user enrollment request. The enrollment invitation link, which when selected, may direct the guest mobile device 112 to a landing page of the client application 116.

At OPERATION 808, a request to initiate enrollment with the electronic lock 100 may be received. In some examples, a selection of an option to initiate enrollment with the electronic lock 100 may be made by the guest user 108, received by the guest mobile device 112, and communicated to the server 114. In some examples, the option to initiate enrollment with the electronic lock 100 may be included in a UI provided by the client application 116. In one example, when the client application 116 is operating on the guest mobile device 112 and when the guest mobile device 112 is within short-range wireless communication range of the electronic lock 100 and receives a short-range wireless communication beacon (e.g., a BLE beacon) transmitted by the electronic lock 100, the client application 116 may provide the option to initiate enrollment in the client application UI. In other examples, the guest mobile device 112 may provide the option to initiate enrollment in the client application UI in response to a determination, using GPS data captured at the guest mobile device, that it is in proximity to the electronic lock 100. In some examples, responsive to the selection to initiate enrollment, the electronic lock 100 may further receive instructions from the server 114 to initiate the enrollment code verification process.

At OPERATION 810, the unique enrollment code associated with the enrollment invitation link and the guest user account may be communicated to the electronic lock 100. In some examples, the unique enrollment code may be included in the instructions received from the server 114 to initiate the enrollment code verification process.

At OPERATION 812, the unique enrollment code may be presented. In some examples, the electronic lock 100 may present the unique enrollment code using the code output interface 512. In one example, the unique enrollment code may be presented visually be one or more lights or the keypad 502. In other examples, the electronic lock 100 may present the unique enrollment code audibly via playing sounds using a speaker or other sound-emitting element that may be included in the electronic lock 100. In other examples, the electronic lock 100 may present the unique enrollment code haptically via providing haptic sensations, such a vibration pattern, using a haptic actuator element that may be included in the electronic lock 100. In still further examples, the electronic lock 100 may present the unique enrollment code visually on a touchscreen or other display, for example by presenting alphanumeric codes or other visual codes on the display.

In yet other example implementations, the unique enrollment code may be presented by the guest mobile device 112. For example, the guest mobile device 112 may be instructed to display the unique enrollment code (e.g., on the screen), play or announce the unique enrollment code audibly (e.g., via a speaker), or present the unique enrollment code haptically (e.g., via a haptic actuator). In some examples, the unique enrollment code may be shared with the guest user 108. For example, the unique enrollment code may be included in the enrollment invitation received by the guest mobile device 112. In other examples, the unique enrollment code may be communicated to the guest mobile device 112 via the server 114 in a separate message.

At OPERATION 814, responsive to the presentation of the unique enrollment code, the unique enrollment code may be received. In some examples, when the unique enrollment code is presented by the electronic lock 100, the unique enrollment code may be sensed by a sensor included in the guest mobile device 112. For example, the camera, microphone, accelerometer, or another input device 702 included in the guest mobile device 112 may be used to sense the displayed, played, or otherwise presented unique enrollment code. In other examples, the unique enrollment code presented by the electronic lock 100 may be observed by the guest user 108, who may use the touchscreen, stylus, keyboard, microphone, camera, or other input device 702 included in the guest mobile device 112 to input the unique enrollment code into the guest mobile device 112.

In other examples, when the unique enrollment code is presented by the guest mobile device 112, the unique enrollment code may be sensed by an input interface 202 included in the electronic lock 100 (e.g., a camera, microphone, haptic sensor) or observed by the guest user 108, who may use the keypad 502 or another input interface 202 included in the electronic lock 100 to input the unique enrollment code.

At OPERATION 816, the presented unique enrollment code may be verified. For example, the received unique enrollment code may be compared against the unique enrollment code generated for and uniquely associated with the guest user account for electronic lock 100. In some examples, prior to verification, the received unique enrollment code may be converted into a format in which it can be compared against the unique enrollment code associated with the guest user account.

In one example implementation, when the unique enrollment code is presented by the electronic lock 100 and received by the guest mobile device 112, the presented and received unique enrollment code may be verified by the client application 116 operating on the guest mobile device 112. For example, as described above, the unique enrollment code may be included in the enrollment invitation sent to the guest mobile device 112; or, the unique enrollment code may be sent by the server 114 to the client application 116 in response to the initiation of the enrollment code verification process with the electronic lock 100 or at another time. In some examples, upon verification of the unique enrollment code, an indication of the successful verification may be sent to the server 114 by the client application 116.

In another example implementation, the guest mobile device 112 may transmit the presented and received unique enrollment code to the server 114 for verification.

In another example implementation, when the unique enrollment code is presented by the guest mobile device 112 and received by the electronic lock 100, the received unique enrollment code may be verified by the electronic lock 100. In some examples, upon verification of the unique enrollment code, an indication of the successful verification may be sent to the server 114 by the client application 116.

Or, in another example implementation, the electronic lock 100 may transmit the presented and received unique enrollment code to the server 114 for verification.

In the various embodiments above, one or more of the electronic lock 100, the server 114, and client application 116 may additionally verify the location of the mobile device 112. This may be, for example, based on sensing the guest mobile device 112 at the electronic lock 100, or by determining a location of the guest mobile device 112 via GPS data at the client application 116, or transmitted to the server 114 and/or electronic lock 100.

At OPERATION 818, upon successful verification of the unique enrollment code, the electronic lock 100 may enter into the secure enrollment mode. In some implementations, the electronic lock 100 may receive instructions from the server 114 to enter into the secure enrollment mode. For example, when the unique enrollment code is presented by the electronic lock 100 and verified by the guest mobile device 112 or the server 114, an indication of the successful verification may be communicated to the electronic lock 100. In other examples, such as when the electronic lock 100 is configured to verify a unique enrollment code presented by the guest mobile device 112, the electronic lock 100 may operate to enter into the secure enrollment mode automatically based on the successful verification of the unique enrollment code. According to an aspect, when the electronic lock 100 enters into the secure enrollment mode, the electronic lock 100 may operate to receive an input of a lock actuation passcode that the guest user 108 can use to actuate the lock 100, or may operate to enter into a pairing mode in which the electronic lock 100 can communicate with the guest mobile device 112 over a short-range wireless connection (e.g., a BLE connection) for receiving lock actuation instructions from the client application 116 operating on the guest mobile device 112.

At OPERATION 820, secure enrollment of the guest user 108 as a user of the electronic lock 100 may be completed. In some examples, during the secure enrollment mode, the guest user 108 may use the input interface 202 to enter a lock actuation passcode that may be registered with the electronic lock 100 for enabling the guest user 108 to actuate the electronic lock 100. As an example, the guest user 108 may input a biometric characteristic, such as a fingerprint, a retina scan, facial characteristics, a voiceprint, etc., or a numeric, alphabetic, or an alphanumeric code.

In other examples, during the secure enrollment mode, the electronic lock 100 can enter into the pairing mode, where the lock and the guest mobile device 112 can communicate and exchange information over a short-range wireless connection. For example, pairing the guest mobile device 112 with the electronic lock 100 may enable the electronic lock 100 to receive lock actuation commands from the client application 116 operating on the guest mobile device 112. Accordingly, the guest user 108 may be enabled to use the electronic lock 100 to gain access to the premises without first having to have access to the interior side of the electronic lock 100 to enroll as a user of the lock. In some examples, the guest user 108 may be enabled to use the electronic lock 100 based on the one or more access control selections made by the administrative user 100.

Figure 9:
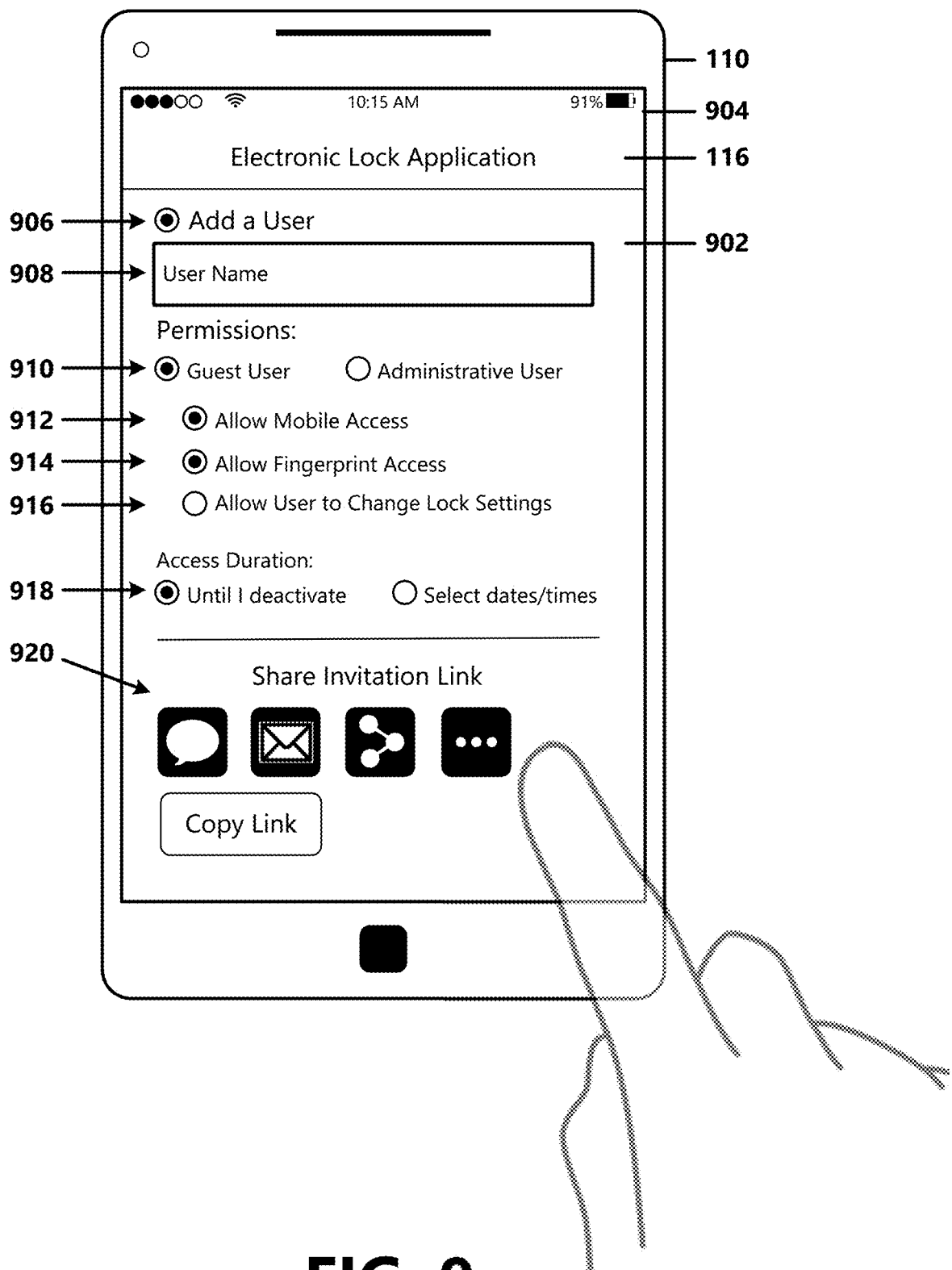
FIG. 9 is an illustration of an example user interface provided by a client application operating on an admin mobile device that can be used for inviting a guest user as a user of the electronic lock.

FIGS. 9-15 show various pictorial representations of aspects of providing secure enrollment of a guest user 108 with an electronic lock 100. With reference now to FIG. 9, a representation of an example UI 902 that may be provided by the electronic lock application 116 operating on the admin mobile device 110 is shown. For example, the UI 902 shown in FIG. 9 is a representation of a UI that may be displayed on a screen 904 of the admin mobile device 110 and that the administrative user 106 may use to select to add the guest user 108 as a user of the electronic lock 100.

According to an aspect, the UI 902 may include various options associated with selecting to add a new user of the electronic lock 100. In some examples, the administrative user 106 may have more than one electronic lock 100 associated with the administrative user account, and the UI 902 may include a listing (not shown) of the electronic locks 100 associated with the account from which the administrative user 106 may select the intended lock. In some examples, when the intended electronic lock 100 is selected (by the administrative user 106 or automatically), the UI 902 may include an option 906 to add a user to the electronic lock 100.

In some examples, upon selection of the option 906 to add a user, the UI 902 may further include an option 908 to enter information about the user, such as the user's name. In some examples, the UI 902 may further include additional options, such as an option 910 to enter permission levels (e.g., guest user 108 versus an administrative user 106); an option 912 to allow the user to have mobile (e.g., use the client application 116 to actuate the lock); an option 914 to allow the user to use the input interface 202 (e.g., a fingerprint sensor, a retina scanner, a camera including facial recognition, an audio interface by which voice recognition may be used to actuate the lock, another type of biometric sensor, a keypad 502) of the electronic lock 100 to actuate the lock; option 916 to allow the user to change lock settings; an option 918 to select a duration of access for the user; and one or more options 920 to share an invitation link with the guest user 108. In some examples, the one or more invitation link sharing options 920 may include an option to send the invitation link via text message, email, social media message, or another communication method.

In some examples, selection to share the invitation link via a particular communication method may operate to instruct the admin mobile device 110 to open a communication application on the admin mobile device 110 and initiate a communication that includes the invitation link and that can be sent to the guest user 108. For example, the administrative user 106 may input the guest user's contact information and send the invitation link to the guest user 108.

In other examples, selection to share the invitation link via a particular communication method may operate to provide an option to input the guest user's contact information and another option to send the invitation link, which when selected, may instruct the server 114 to send the invitation link to the guest user 108 based on the input contact information.

In other examples, an option may be provided to copy the invitation link, which the administrative user 106 may be enabled to paste into a communication that may be sent to the guest user 108 via a particular communication method. As should be appreciated, additional and/or alternative options may be provided in the UI 902 and are within the scope of the present disclosure.

Figure 10:
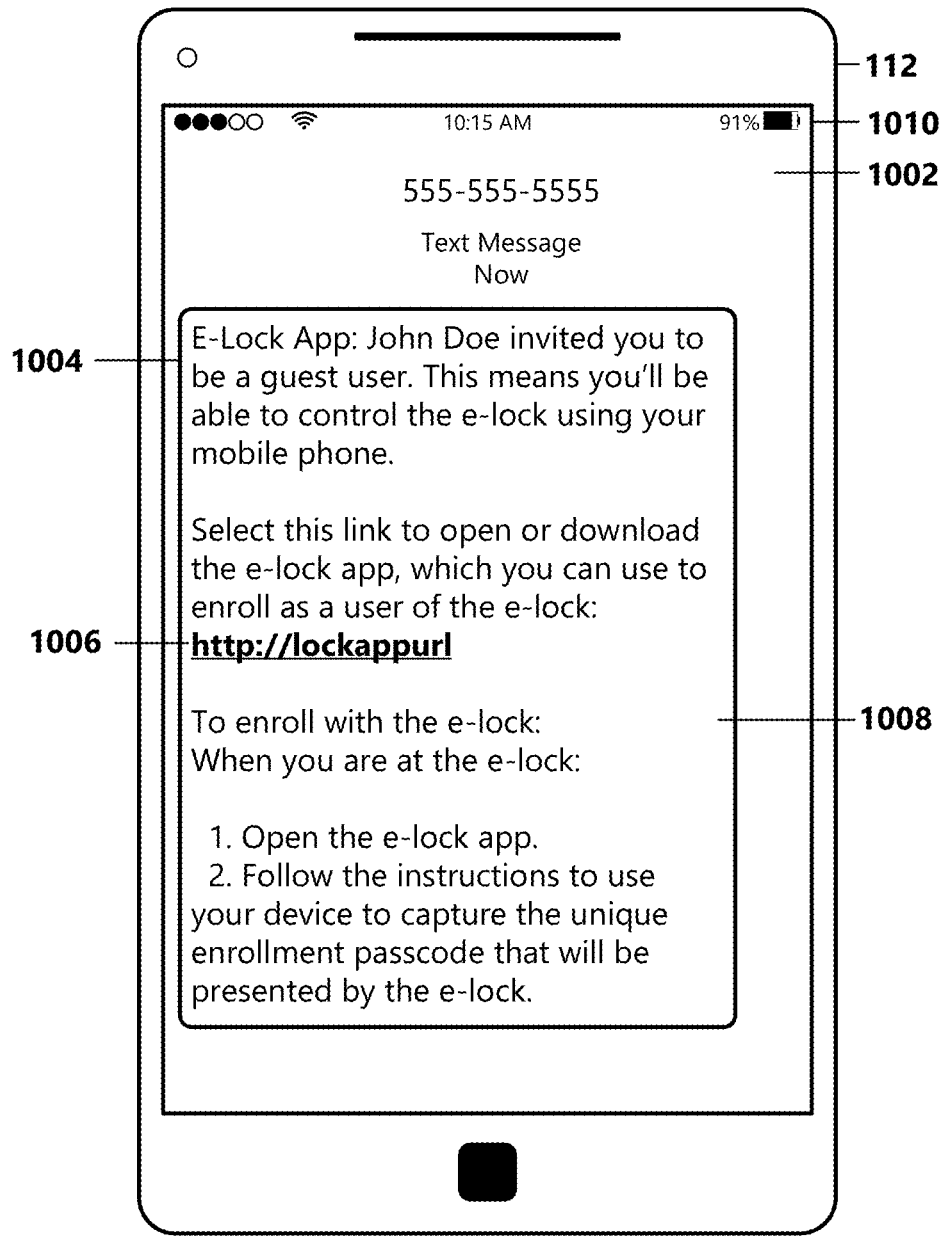
FIG. 10 is an illustration of an example enrollment invitation link that may be sent to and received by a guest mobile device.

With reference now to FIG. 10, an example messaging application user interface 1002 is shown displayed on a screen 1010 of the guest mobile device 112. For example, an example invitation message 1004 may be generated by the admin mobile device 110 or by the server 114 responsive to a selection to add the guest user 108 as a user of the electronic lock 100. As should be appreciated, the format of the invitation message 1004 may differ based on various factors, such as the communication method selected. For example, the example invitation message 1004 illustrated in FIG. 10 is a text message displayed in a text messaging application user interface 1010. However, in other examples, the invitation message 1004 may be an email, social media message, or other type of communication.

As shown, the invitation message 1004 may include an enrollment invitation link 1006 alongside enrollment instructions 1008. In some examples, selection of the enrollment invitation link 1006 may direct the guest mobile device 112 to a landing page of the client application 116. If the client application 116 has not already been downloaded onto the guest mobile device 112, the guest mobile device 112 may first be directed to a location where the client application 116 may be accessed and downloaded (e.g., a mobile application store or a webpage associated with the server 114). As mentioned above, in some examples, the enrollment invitation link 1006 may be linked to a guest user account and a unique enrollment code for the electronic lock 100 that may be created based on the administrative user's request to invite the guest user 108 as a user of the electronic lock 100.

Figure 11:
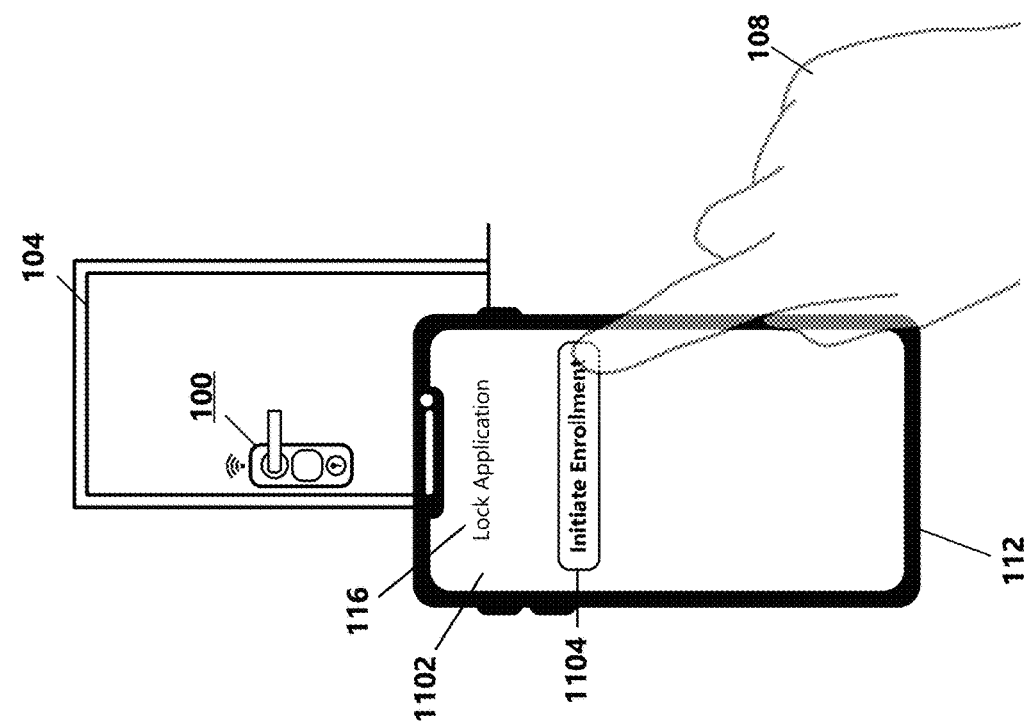
FIG. 11 is an illustration of an option to initiate enrollment with the electronic lock included in an example user interface provided by the client application operating on the guest mobile device responsive to a selection of the enrollment invitation link.

With reference now to FIG. 11, a representation of an example UI 1102 that the client application 116 may operate to display on the screen 1010 of the guest mobile device 112 is shown. For example, the example UI 1102 may be included in a landing page displayed by the client application 116 after the client application 116 is installed or opened on the guest mobile device 112. In some examples and as shown, the UI 1102 may include an option 1104 to initiate enrollment with the electronic lock 100. For example, responsive to a selection of the option 1104 to initiate enrollment, a communication may be provided to the electronic lock 100 to initiate the enrollment code verification process.

Figure 12:
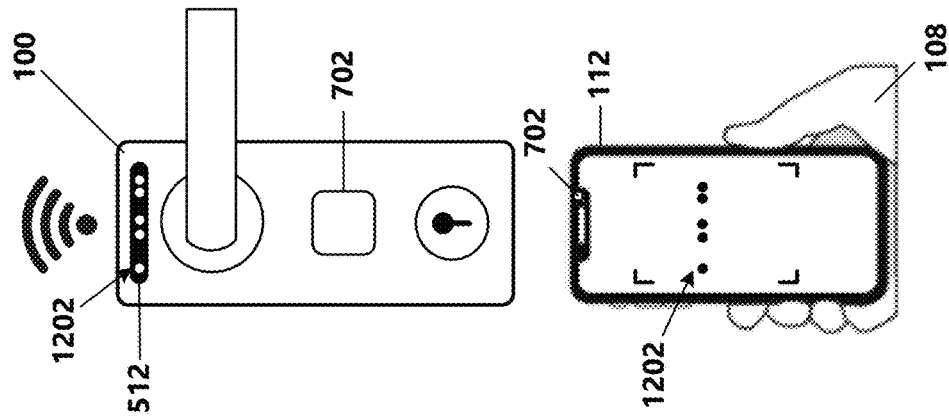
FIG. 12 is an illustration of a pictorial representation of the guest mobile device capturing a unique enrollment code associated with the selected enrollment invitation link presented by the electronic lock.

With reference now to FIG. 12, an illustration is provided showing the guest user 108 and the guest mobile device 112 within proximity of the electronic lock 100 and a unique enrollment code 1202 being presented by the electronic lock 100 and captured by the guest mobile device 112. According to an aspect, when the guest user 108 is within proximity of the electronic lock 100, the guest user 108 may select the option 1104 to initiate enrollment. For example, the electronic lock 100 may present the unique enrollment code 1202 via use of the code output interface 512, which in the illustrated example, includes a plurality of lights or LEDs that may be illuminated to present the unique enrollment code 1202 visually. Further, the guest mobile device 112 may operate to capture the presented unique enrollment code 1202 via use of an input device 702, which in the illustrated example, includes a camera. For example, the captured unique enrollment code 1202 may be compared against the unique enrollment code 1202 stored in association with the guest user account for the electronic lock 100.

In some examples, upon verification of the presented unique enrollment code 1202, the electronic lock 100 may receive a communication of the verification, which may initiate the secure enrollment mode. In some examples, when the electronic lock 100 is in the secure enrollment mode, the lock may be enabled to receive a lock actuation passcode to be registered with the electronic lock 100. In one example and as illustrated in FIG. 13, the lock actuation passcode may be a biometric characteristic of the guest user 108, such as a fingerprint, which may be received by the electronic lock 100 via an input interface 202, such as a fingerprint sensor. In another example and as illustrated in FIG. 14, the lock actuation passcode may be an alphanumeric passcode, which may be received by the electronic lock 100 via an input interface 202, such as a keypad 502.

In some examples, when the electronic lock 100 is in the secure enrollment mode, the electronic lock 100 may be enabled to enter into a pairing mode, which may allow the electronic lock 100 to communicate 1502 with a mobile device (e.g., guest mobile device 112) within short-range wireless communication range for enabling the mobile device to be paired with the electronic lock 100. For example, when the guest mobile device 112 and the electronic lock 100 are paired, the client application 116 operating on the guest mobile device 112 can be used to send lock actuation commands to the electronic lock 100, and the electronic lock 100 may operate to receive and perform the lock actuation commands for moving the bolt 214 between the locked and unlocked positions.

Referring to FIGS. 1-15 generally, although the present disclosure generally describes a pairing arrangement in which an electronic lock 100 communicates an enrollment code to a guest mobile device 112, in alternative embodiments, for example where the electronic lock 100 further includes a camera (not shown), the guest mobile device 112 may be provisioned to output the unique enrollment code 1202 via a flash device included in the input device 702 (e.g., camera), with a camera of the electronic lock capturing that enrollment code. In such instances, the unique enrollment code is provided to the mobile device in response to selection of an enrollment invitation link, and the electronic lock may be configured to capture the unique enrollment code and enter a secure enrollment mode upon verification (e.g., either at the electronic lock or via a cloud account, e.g., at server 114). The processes described above are generally equivalent for such an arrangement.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. An electronic lock comprising:
a latch assembly including a bolt movable between a locked position and an unlocked position;
a motor configured to receive an actuation command causing the motor to move the bolt from the locked position to the unlocked position or from the unlocked position to the locked position;
a wireless circuit configured to communicate wirelessly with a client application installed on a mobile device;
a code output interface configured to present a unique enrollment code;
at least one processor; and
a memory communicatively connected to the at least one processor, the memory storing instructions which, when executed, cause the electronic lock to:
receive a unique enrollment code associated with an enrollment invitation link provided to a guest user;
in response to receiving an indication to initiate an enrollment code verification process based on a selection of the enrollment invitation link, present the unique enrollment code via the code output interface; and
in response to receiving an indication that the unique enrollment code has been received by a mobile device and verified, enter into a secure enrollment mode that enables the guest user to enroll as a user of the electronic lock.

2. The electronic lock of claim 1, wherein the enrollment invitation link includes a token linked to a guest user account associated with the electronic lock.

3. The electronic lock of claim 1, wherein the unique enrollment code is a visual passcode presented by illuminating one or more lights included in the electronic lock according to a specific pattern.

4. The electronic lock of claim 1, wherein the unique enrollment code is an audible passcode presented by generating sounds using a sound-emitting element included in the electronic lock according to a specific pattern or frequency.

5. The electronic lock of claim 1, wherein the unique enrollment code is a haptic passcode presented by generating a vibration using a haptic actuator element included in the electronic lock according to a specific pattern.

6. The electronic lock of claim 1, wherein the unique enrollment code and the enrollment invitation link are created based on a request by an administrative user of the electronic lock to add the guest user as a user of the electronic lock.

7. The electronic lock of claim 1, wherein when the electronic lock enters into the secure enrollment mode, the instructions cause the electronic lock to:
receive a lock actuation passcode; and
store the lock actuation passcode, wherein subsequent entry of the lock actuation passcode causes the at least one processor to perform the actuation command to cause the motor to move the bolt from the locked position to the unlocked position or from the unlocked position to the locked position.

8. The electronic lock of claim 7, wherein the lock actuation passcode includes:
a biometric passcode received via a biometric input interface; or
an alphanumeric passcode received via a keypad.

9. The electronic lock of claim 1, wherein when the electronic lock enters into the secure enrollment mode, the instructions cause the electronic lock to:
enter into a wireless communication pairing mode; and
establish a wireless communication channel with the mobile device when the mobile device is within wireless communication range of the electronic lock.

10. The electronic lock of claim 9, wherein the instructions further cause the electronic lock to:
pair with the mobile device;
receive the actuation command from the client application installed on the mobile device; and
perform the actuation command to cause the motor to move the bolt from the locked position to the unlocked position or from the unlocked position to the locked position.

11. A method for providing secure enrollment of a user with an electronic lock, wherein the electronic lock includes:
a latch assembly including a bolt movable between a locked position and an unlocked position;
a motor configured to receive an actuation command causing the motor to move the bolt from the locked position to the unlocked position or from the unlocked position to the locked position;
a wireless circuit configured to communicate wirelessly with a client application installed on a mobile device;
a code output interface configured to present a unique enrollment code;
at least one processor; and
a memory communicatively connected to the at least one processor;
the method comprising:
receiving the unique enrollment code associated with an enrollment invitation link provided to a guest user;
in response to receiving an indication to initiate an enrollment code verification process, presenting the unique enrollment code via the code output interface; and
in response to receiving an indication that the unique enrollment code has been received by the mobile device and verified, entering into a secure enrollment mode that enables the guest user to enroll as a user of the electronic lock.

12. The method of claim 11, wherein presenting the unique enrollment code comprises one of:
illuminating one or more lights included in the electronic lock according to a specific pattern;
generating sounds using a sound-emitting element included in the electronic lock according to a specific pattern or frequency; or
generating vibrations using a haptic actuator element included in the electronic lock according to a specific pattern.

13. The method of claim 11, further comprising, when the electronic lock enters into the secure enrollment mode:
receiving a lock actuation passcode; and
storing the lock actuation passcode, wherein subsequent entry of the lock actuation passcode causes the at least one processor to perform the actuation command to cause the motor to move the bolt from the locked position to the unlocked position or from the unlocked position to the locked position.

14. The method of claim 13, wherein receiving the lock actuation passcode includes:
receiving a biometric passcode received via a biometric input interface; or
receiving an alphanumeric passcode received via a keypad.

15. The method of claim 11, further comprising, when the electronic lock enters into the secure enrollment mode:
entering into a wireless communication pairing mode; and
establishing a wireless communication channel with the mobile device when the mobile device is within wireless communication range of the electronic lock.

16. The method of claim 15, further comprising:
pairing with the mobile device;
receiving the actuation command from the client application installed on the mobile device; and
performing the actuation command to cause the motor to move the bolt from the locked position to the unlocked position or from the unlocked position to the locked position.

17. A system for providing secure enrollment of a user with an electronic lock, the system comprising:
at least one processor; and
a memory communicatively connected to the at least one processor, the memory storing instructions which, when executed, cause the system to:
in response to receiving a selection of an enrollment invitation link associated with a guest user account for the electronic lock and a unique enrollment code, provide, on a mobile device, a user interface including an option to initiate enrollment with the electronic lock;
receive a selection of the option to initiate enrollment with the electronic lock when the mobile device is proximate to the electronic lock;
notify a server of the selection to initiate enrollment;
receive, via the user interface, an input of the unique enrollment code presented by the electronic lock based on the selection to initiate enrollment; and verify the presented unique enrollment code against the unique enrollment code associated with the enrollment invitation link for enabling the electronic lock to enter into a secure enrollment mode that enables the guest user to enroll as a user of the electronic lock.

18. The system of claim 17, wherein the enrollment invitation link is created in response to a selection made via an administrative account associated with the electronic lock to add the guest user as a user of the electronic lock.

19. The system of claim 17, wherein, in receiving the input of the unique enrollment code, the system is operative to receive:
- a visual passcode presented as an illumination of one or more lights included in the electronic lock according to a specific pattern;
- an audible passcode presented as sounds generated by a sound-emitting element included in the electronic lock according to a specific pattern or frequency; or
- a haptic passcode presented as vibrations generated by a haptic actuator element included in the electronic lock according to a specific pattern.

20. The system of claim 17, wherein prior to providing the user interface including the option to initiate enrollment with the electronic lock, providing, via the user interface, an option to establish a password for accessing the guest user account.

* * * * *